(12) United States Patent
Wang et al.

(10) Patent No.: US 8,506,895 B2
(45) Date of Patent: Aug. 13, 2013

(54) GAS-LIQUID-SOLID THREE-PHASE SUSPENSION BED REACTOR FOR FISCHER-TROPSCH SYNTHESIS AND ITS APPLICATIONS

(75) Inventors: Jinsheng Wang, Taiyuan (CN); Xu Hao, Taiyuan (CN); Dongxun Liu, Taiyuan (CN); Liang Bai, Taiyuan (CN); Liren Cao, Taiyuan (CN); Yongwang Li, Taiyuan (CN)

(73) Assignee: Synfuels China Technology Co. Ltd., Beijing (CN)

( * ) Notice: Subject to any disclaimer, the term of this patent is extended or adjusted under 35 U.S.C. 154(b) by 352 days.

(21) Appl. No.: 12/527,355

(22) PCT Filed: Oct. 12, 2007

(86) PCT No.: PCT/CN2007/002941
§ 371 (c)(1),
(2), (4) Date: Mar. 29, 2010

(87) PCT Pub. No.: WO2009/043201
PCT Pub. Date: Apr. 9, 2009

(65) Prior Publication Data
US 2010/0216896 A1  Aug. 26, 2010

(30) Foreign Application Priority Data
Sep. 29, 2007 (CN) .......................... 2007 1 0161575

(51) Int. Cl.
*C07C 27/06* (2006.01)
*B01J 8/08* (2006.01)

(52) U.S. Cl.
USPC .......................... 422/211; 518/700

(58) Field of Classification Search
USPC .......................... 422/211; 518/700
See application file for complete search history.

(56) References Cited

U.S. PATENT DOCUMENTS

| | | | |
|---|---|---|---|
| 5,382,748 A | | 1/1995 | Behrmann et al. |
| 5,905,094 A | | 5/1999 | Chang et al. |
| 5,961,933 A | * | 10/1999 | Casanave et al. ............. 422/211 |
| 6,201,031 B1 | | 3/2001 | Steynberg et al. |
| RE37,229 E | | 6/2001 | Behrmann et al. |
| 6,265,452 B1 | | 7/2001 | Steynberg et al. |
| 6,462,098 B1 | | 10/2002 | Vogel et al. |

FOREIGN PATENT DOCUMENTS

| | | |
|---|---|---|
| CA | 2466009 A1 | 7/2003 |
| CN | 1128667 C | 11/2003 |
| CN | 1159098 C | 7/2004 |
| CN | 1600412 A | 3/2005 |
| CN | 1199730 C | 5/2005 |
| CN | 1233453 C | 12/2005 |
| CN | 1233454 C | 12/2005 |
| CN | 1245255 C | 3/2006 |
| CN | 1260007 C | 6/2006 |
| CN | 1270822 C | 8/2006 |

OTHER PUBLICATIONS

Steynberg ("Fischer-Tropsch Technology" in Studies in Surface Science and Catalysis, v. 152, p. 1-700 (2004)).*
Zhu et al. (English Translation of: CN 1600412 (Published Mar. 30, 2005)).*
Coulson and Richardson (eds.), Chemical Engineering, vol. 2, Fifth Edition, Butterworth Heinemann, Oxford, England, 2002, 462 pages.
Davis, "Overview of Reactors for Liquid Phase Fischer-Tropsch Synthesis," Catalysis Today 71:249-300, 2002.
Dry, Catalysis Science and Technology, Springer Verlag, 1981, Chapter 4, pp. 162-169.
Dry, "Practical and Theoretical Aspects of the Catalytic Fischer-Tropsch Process," Applied Catalysis A: General 138:319-344, 1996.
Fischer et al., "Katalytische Gasreaktionen in Flussigem Medium," Brennstoff-Chemie 12(15):286-293, 1931.
Fischer et al., "Uber den Einfluss von Druck und Temeratur auf die Synthese von Benzin und Synthol in Flussigem Medium," Brennstoff-Chemie 14(1):3-8, 1933.
Fischer et al., "Wissenschaftliches uber die Synthese von Kogasin und Paraffin in Wassriger Phase," Brennstoff-Chemie 20(13):247-250, 1939.
Handbook of Separation Techniques for Chemical Engineers, Second Edition, McGraw-Hill, 1988, 198 pages.
Kolbel et al., "Neue Entwicklung zur Kohlenwasserstoff-Synthese," Erdol Und Kohle 9(4):225-306, 1956.
Perry's Chemical Engineers' Handbook, Eighth Edition, McGraw-Hill, 2008, 111 pages.
Steynberg et al., "Fischer-Tropsch Reactors," Studies in Surface Science and Catalysis vol. 152, 132 pages, 2004.

* cited by examiner

*Primary Examiner* — Robert Havlin
(74) *Attorney, Agent, or Firm* — Seed IP Law Group PLLC

(57) ABSTRACT

A Fischer-Tropsch synthesis three-phase suspension bed reactor ("suspension bed" also called "slurry bed") and its supplemental systems, may include: 1) structure and dimension design of F-T synthesis reactor, 2) a gas distributor located at the bottom of the reactor, 3) structure and arrangement of a heat exchanger members inside the reactor, 4) a liquid-solid filtration separation device inside reactor, 5) a flow guidance device inside reactor, 6) a condensate flux and separation member located in the gas phase space at the top of reactor, 7) a pressure stabilizer, a cleaning system for the separation device; an online cleaning system for the gas distributor; an ancillary system for slurry deposition and a pre-condensate and mist separation system located at the outlet of upper reactor. This reactor is suitable for industrial scale application of Fischer-Tropsch synthesis.

20 Claims, 20 Drawing Sheets

GAS-LIQUID-SOLID THREE-PHASE SUSPENSION BED REACTOR FOR FISCHER-TROPSCH SYNTHESIS AND ITS APPLICATIONS

TECHNICAL FIELD

The present application relates to a gas-liquid-solid suspension reactor (slurry reactor) and its supplemental systems, which specifically relates to the reactor configuration and dimension design, layout and design of the gas distributor and heat exchanger, the wax and catalyst filtration system, the reactor internal flow guidance device, and the mist removal device at the top of the reactor; and the application of the reactor in large scale Fischer-Tropsch production processes.

BACKGROUND

F-T synthesis process is a chemical conversion process to convert synthesis gas ($CO+H_2$) into hydrocarbons and a small amount of oxygenates (methanol, ethanol, acetic acid, aldehyde, acetone, ethyl acetate, etc). The chemical process in conversion of synthesis gas to the hereinabove mentioned compounds needs a catalyst under suitable temperature and pressure, with significant reaction heat released during the reaction process. Compared to conventional fixed bed reactor technology, gas-liquid-solid three-phase suspension bed reactor technology can realize efficient reaction temperature control and heat removal, with enhanced catalyst productivity at the same time, which is beneficial to the large scale production. The reaction conditions for catalysts are improved compared to conventional gas-solid fluidized bed reactor, which is favorable to the reduction of catalyst loss, and the selective synthesis of heavy distillates and further enhancement of selectivity to the middle distillates especially diesel fuels.

Soon after the discovery of Fischer Tropsch synthesis by German scientists in the last century, research and development was carried out on gas-liquid-solid three-phase suspension reactor for the reaction (F. Fischer and K. Peters, Brenst. Chem. 12 286-293, 1931; and H. Küster, Brenstoff-Chemie, 14, 3-8, 1933; F. Fischer and H. Pichler, Brendstof-Chemie, 20, 1939, 247). Due to limitations on the reaction process and technical conditions in the early stage, further scale-up was not suitable even though the development of F-T three-phase reactor had been proved in the lab scale. Major issues were: 1) test result was no better than the conventional fixed bed reactor; 2) the three-phase suspension bed reactor requires larger reactor volume; 3) reactor needs to be resistant to acids; 4) large recycle volume and high energy consumption are needed in order to get complete mixing; and 5) difficulty in removing products from the reactor. During the 1940-1950, a large amount of scale-up work on three-phase suspension bed Fischer-Tropsch synthesis reactor were carried out in some German research institutes and American Bureau of Mine (H. Köl bel, P. Ackermann and F. Engelhardt, Erdöl u. Kohle, 9(153) 225-303, 1956; B. H. Davis, Catalysis Today, 71, 249-300, 2002), which proved some basic principles in scale-up of the F-T synthesis reaction by passing synthesis gas through the catalyst bed suspended in a liquid paraffin, especially the possibility in using the F-T heavy products as liquid media under relatively low temperatures (180-250° C.). Due to knowledge limitations on the basic fluid dynamics of the three-phase suspension bed reactor system and Fischer-Tropsch process, the technology development in the early phase used very low superficial velocity, which resulted in a reactor processing capability unsuitable for commercial scale production. (A. P. Steynberg, M. E. Dry, B. H. Davis and B. B. Breman, in Studies in Surface Science and Catalysis 152, A. Steynberg and M. Dry (eds.), p 64-195, Elsevier B. V., 2004; M. E. Dry, in Catalysis Science and Technology, J. R. Anderson and M. Boudart (eds.), Springer Verlag, p 159, 1981; M. E. Dry, Applied Catalysis A: General, 138, 319, 1996).

In addition to the process technology limitations by the Fischer-Tropsch synthesis itself, efficient correlation study results on the fluid flow modes to parameters such as superficial velocity and three-phase bubble reactor internal diameter under the reactor operation conditions play important roles in the development of the gas-liquid-solid three-phase suspension reactor for F-T synthesis. During the late 1980s up to 1990s, some research results in fact demonstrated the minimum dimension of the pilot test facility that meets the requirements of industrial reactor scale-up; which also led developers to realize that too low reactor height and tower inlet gas velocity is lack of engineering significance. During 1990s, SASOL TECH PTY LTD in South African built and ran a three phase suspension bed F-T synthesis reactor of one-meter internal diameter in their pilot scale test and later a five meter industrial scale three-phase suspension bed F-T synthesis reactor. These developments by Sasol basically met objectives for using these reactors at industrial scales. (A. P. Steynberg, M. E. Dry, B. H. Davis and B. B. Breman, in Studies in Surface Science and Catalysis 152, A. Steynberg and M. Dry (eds.), p 64-195, Elsevier B. V., 2004).

The three-phase suspension reactor technology development for F-T synthesis is based on the earlier basic concept that F-T synthesis can be carried out in three-phase bed, with focus on efficient technologies in strengthening operation and realizing continuous and stable operation. Background information on technology development mainly includes the following aspects:

1. The gas distribution issue: the research and development on the gas distributor of the gas-liquid-solid three-phase (slurry) F-T synthesis reactor is closely connected to the whole reactor development, with academic attention focused on how to make gas distribution uniform and to generate bubbles as small as possible, while the basic fact is that the gas distributor of large scale reactors under highly turbulent conditions is only effective within a limited space above the distributor and the whole bed is re-mixed and distributed by turbulence and internal members has been neglected. Within a practical reactor, the role of gas distributor, besides uniformly distributing the reactor inlet gas over the cross-section at the bottom of the reactor, is, to a large extent, to prevent settling of catalyst by agitation via injecting gas from the gas distributor at the bottom of the reactor, and to prevent blockage by accidental entry of slurry into the gas distributor. These issues were not considered in public materials. For example, U.S. Pat. No. 5,905,094 refers to a kind of gas distributor, which uses a design of a series axially enlarged apertures on the clapboard on the upper part of the clapboard located in the reactor bottom. Major issues with the design are the difficulty in fabricating apertures (openings) on the gas distributor for feed gas passing through while providing no definite methods in strengthening the clapboard strength. Meanwhile, if the reactor inlet gas is accidentally stopped and leads to catalyst particles blockage at the above mentioned openings, the system will encounter problems during restart-up, with part of openings blocked and therefore causing non-uniform gas distribution. Thus application of this technology requires a series ancillary means to guarantee no harmful result happens to the reactor operation under all circumstances. Nevertheless, no public materials were found regarding these relevant ancillary process means; CN 1233454C refers to a kind of overall structure found in an engineering design handbook (e.g., Perry's Chemical Engineer's Handbook, Sixth Edition, McGraw-Hill, 1984) where relative simple gas distributor designs can be found, and the gas introduction and distribution can be realized by setting up clapboards, with gas ejected into the three-phase reaction zone via the downwards pointed small nozzles (above the upper surface of the clapboard) connected to the primary distribution conduit. Problems with this design are complexity in fabricating nozzles, the still high risk of nozzle blockage, and no relevant public materials on measures for preventing blockage.

2. Efficient design of heat exchange system: the F-T synthesis process is a typical energy type conversion process. From energy conversion point of view, synthesis gas is converted to hydrocarbons while 15-25% energy input to the reactor is converted to reaction heat. Thus efficient heat exchange is required to guarantee: 1) efficient temperature control of the reactor bed; 2) efficient reaction heat removal; and 3) heat input during startup. The basic process requirement on the configuration of the heat exchanger within a large-scale suspension bed reactor is to benefit fluid dynamics within the reactor and the capability for efficient heat removal. So far there appears to be no systematic feasible design for the heat exchange parts in such an F-T synthesis suspension bed reactor, e.g., the U.S. Pat. No. 6,201,031B1 indicated the use of multiple structure of U-tube connected in series, and the patent CN1233451C referred to pipes in a spiral or detoured multiple pass heat exchange pipe. Also mentioned in some patents is the difficulty in the layout of these shell-and-tube structures inside reactor, the improper layout of heat exchanger structure can cause a series of problems. First is non-uniform disturbance on flow field; second is excess blockage within local volume which is harmful to slurry recycle; third, the heat exchange area layout is limited and thus influences the reaction heat recovery efficiency. Other issues include structure vibration, stress concentration, etc., all of which have no systematic solution.

3. Efficient separation of liquid wax product and catalyst: the heavy products from F-T synthesis is in liquid form under reaction conditions and will gradually accumulate inside the three-phase suspension bed reactor, which have to be on-lined removed from the reactor. Because this heavy liquid wax generally coexists with F-T synthesis catalyst in the slurry form, the primary means of realizing this operation is continuous liquid-solid separation. Because the catalyst particle size used for F-T synthesis is generally in the range of 30-200 micron (more than 90%), it is suitable to use filtration as liquid-solid separation means. Liquid-solid filtration separation is a conventional engineering problem. All kind of filtration technologies as standard unit operation can be found in standard chemical engineering handbook and publications (e.g., Chemical Engineering, Vol. 2, Fourth Edition, Butterworth-Heinemann, Linacre House, Jordan Hill, Oxford OX2 8DP, 1991, Handbook of Separation Techniques for Chemical Engineers, Second Edition, McGraw-Hill, 1988). Among them, catalyst separation technology suitable for the three-phase suspension bed (slurry bed reactor) uses filtration pipes (candle design or shell-and-tube design). Compared to conventional filters, the space in the reactor is naturally taken as the higher pressure container for pressurized filtration, with the porous filtration pipe surface as support for filtered cake. The filtered cake reenters the three-phase bed to continue its catalytic function via washing by the turbulent three-phase fluid and back flow cleaning measures. In publicized U.S. Pat. No. 6,462,098B1, filtration process principle was tested for specific F-T synthesis catalyst and reactor system. The filtration device used was similar to candle structure with outlet conduit installed at the bottom part for transporting separated heavy wax from the reactor, at the same time backflow cleaning operation can also be carried out. For example, Chinese patent CN1233453C reported a set of automatic filtration equipment, wherein shell-and-tube structure equipped with outlet pipe devices, with upper part for back blowing and lower part for conducting away filtrate. This filtration equipment can be set up to five layers. In these technical materials, no structural optimization design during reactor integration has been mentioned in order to meet the following synthesis process requirements: 1) the effect of filtration structure on fluid dynamics and furthermore effect on filtration environment, 2) disturbance on flow field by filtration devices and outlet conduit extended from the device, which may possibly make the filtering media of the filtration device exposed to the sustained large bubbles and how to prevent the thus generated inefficient filtration problem, 3) structural configuration of filtration modules and how to realize uniform distribution of fluid dynamics for each of the filtering element within filter group, and 4) how to seamlessly integrate reactor internal filter separation apparatus and heat exchange apparatus and to prevent the catalyst from being exposed to excess temperature, which could accelerate the deactivation of the whole reaction catalyst bed, especially in filter cake where heat removal capacity in the filtration area is relatively weak.

4. Liquid-solid strengthened mixing in three-phase reactor: For F-T synthesis reactor, because there is no complete design scheme for internal members such as heat exchangers, filtration separation device inside the whole reactor space, the efficiency for fluid dynamics strengthening means in published materials is different. Axially along the reactor, internal members are mounted by sections, the proper allocation of which can strengthen fluid dynamic characteristics, e.g., the size distribution of bubbles may be more beneficial to the efficient operation of synthesis reaction, and also fluid dynamics distribution characteristics radially along the reactor cross section may be improved. However, the existence of these internal members leads to many complex structural factors for flow field axially along the reactor. The flow field of the main body part inside a section of the internal members shows uniformity, while at the both ends there may show a trend of flow field structure degradation, which can cause local recycle inside the three-phase reaction zone and influence the catalyst distribution uniformity across the whole bed and the efficiency of heat exchange and separation components. In U.S. Pat. Nos. 5,382,748, RE37229E, U.S. Pat. No. 6,201,031B1, it was reported that vertical drop tube could improve the slurry recycle axially across the reactor and thus was beneficial to the catalyst distribution uniformity axially across the reactor. This also proves the correctness of the general principles of the three-phase fluidized reactor. These materials did not consider the relation between reaction overall structure and drop tube configuration and structures, thus did not meet the basic requirements of optimization design.

5. The problem of reactor outlet mist entrainment and high solid contents in condensates: In previous study, there was no reasonable scheme for the reactor top design, which may cause too much liquid and catalyst entrainment in the reaction system and gas flow, and thus too high solid contents in the condensed heavy products. This negatively influences the efficiency of product workup technology and the secondary product purification, especially when accidentally there is too much foam or liquid overflow, for which there is no systematic solution to entrainment problems in design plan. U.S. Pat. No. 6,265,452B1 presented a scheme to solve solid entrainment and extract part of the condensates by setting up pieces of members similar to distillation trays inside gas phase in the upper reactor space. This adds to the reactor structure complexity and it was not proved whether these trays/plates can operate normally under the solid entrainment conditions, especially in the case of malfunctioned overflow weir due to entrained solids, accidentally liquid overflow (when system suddenly experiences a pressure drop more than 0.1 Mpa). The aftermath would be serious.

SUMMARY OF THE INVENTION

Embodiments of the present invention take the fluid dynamics of the three-phase suspension bed reactor and the characteristics of F-T synthesis catalyst into consideration. Turbulent operation conditions are proposed with reasonable height of above 30 m and the reactor internal diameter of more than 0.28 m to well present industrial operation of a slurry F-T reactor. At the same time, technical issues such as liquid-solid separation, heat exchange and reactor temperature control, gas distribution and mist effective elimination to control the mist entrainment in the gas flow have been taken into account in order to reach optimized layout of the reactor and the necessary ancillary equipments; a three-phase suspension bed reactor and its relevant ancillary equipments suitable for F-T synthesis is therefore invented.

The characteristics of the embodiments of the present invention may include: 1) adoption of highly turbulent operation conditions, which makes the slurry F-T synthesis reactor break the limitations by gas handling capacity and thus increases its production capacity. The breakthrough is based on the catalyst specifically for the embodiments of this invention (see Chinese patents: CN1128667C, CN1159098C, CN1245255C, CN1260007C, CN1199730C, CN1270822C, and later improved F-T synthesis catalysts based on these patents). The excellent conversion capability of the catalyst guarantees the maximum gas handling capacity (90-96% synthesis gas conversion in the synthesis recycle loop). The weight concentration of catalyst in the slurry is no more than 35% (10-25% for the above catalysts), which is the basic limit conditions in determining reactor diameter and production scale; 2) a simple structure of the inlet gas distributor and its supplemental system, which can realize gas distribution, efficient slurry fluidization and avoiding distributor blockage in any event; 3) a flexible heat exchange-temperature control system, which can assure complete and efficient F-T synthesis reaction inside the slurry bed reactor; 4) a highly efficient liquid-solid separation system, which combines the reactor overall structure, integrates reaction main body structure, achieving efficient solid-liquid separation as well as maintaining fluid field in a high turbulent form. The F-T heavy products filtered has a solid content less than 100 ppm, generally less than 5 ppm, with the catalyst in the filter cake remain at highly active state, which can be washed and recycled back to the three-phase bed to continue its catalytic function; 5) a strengthened catalyst distribution and effective mist separation measures in the design of three-phase suspension bed F-T synthesis reactor. These characteristics ensure the F-T reactor in the embodiments of the present invention can realize various F-T synthesis functions with simplified structure and operation, and meanwhile with reduced reactor manufacture and operation cost.

In the three-phase suspension bed (also called "slurry bed") reactor for F-T synthesis (Fischer-Tropsch synthesis, also F-T synthesis) and its supplemental systems have been strictly optimized in process and engineering aspects. The design has been systematically tested in pilot plant scale reactor and cold large scale test facility. Combined with Computer Fluid Dynamics (CFD) research, a complete scheme for reactor and its supplemental system was conceived, the optimized configuration of which can guarantee the reactor to meet the target of long-term operation.

Embodiments of the present invention may provide a reactor system suitable for large scale F-T synthesis process, and the F-T synthesis method within the reactor.

The reactor system comprises the gas-liquid-solid three-phase suspension bed reactor and its supplemental system for F-T synthesis. It is a kind of reactor for F-T synthesis reaction of synthesis gas ($CO+H_2$) which can synthesize F-T fuel by low temperature slurry bed process or high temperature slurry bed process in the presence of catalyst. The reactor mainly comprises: 1) a vertical cylindrical reactor main body of 25-45 meter high; 2) the direct introduced type or clapboard distributed type gas distributor located at the bottom of reactor; 3) the primary heat exchanger located at lower part of the reaction zone, the optionally selected secondary primary heat exchanger crossing three-phase reaction zone and the upper gas phase region, and the ancillary heat exchanger located above the separation zone; 4) multiple sets of solid catalyst-liquid heavy products separator; 5) one or more groups of flow guidance pipes for improving catalyst distribution axially along the reactor; 6) mist separation device located in the top of reactor; and 7) supplemental systems for the above equipment, including ancillary system at the bottom of reactor for handling deposited slurry, and optionally selected pre-condensate and mist separation system located in the top of reactor outlet.

The reactor main body is a cylindrical body, and size of the cylindrical body is determined by limited conditions such as designed production scale, characteristics of catalyst and operation process technologies. The internal diameter of the cylinder is mainly determined by production scale requirement and the gas flow rate under the designed process conditions. Major limit conditions are: a) a gas-liquid-solid bubbling stirred turbulent condition with reaction gas passing through the gas-liquid-solid suspension bed, leading to a gas-liquid-solid transport environment with strengthened gas-liquid-solid mass transport and heat transport during the F-T reaction, which generally dictates a superficial gas velocity of more than 0.20 m/s; b) larger gas velocity is beneficial to increasing reactor production load; c) the reactor capacity should also meet the heat transport limit; the increased reaction heat with increasing capacity will lead to increased heat transport area inside reactor and thus increase the complexity of reactor internal structure or lower the pressure of steam; d) under effectively strengthened operation conditions, the upper limit of gas velocity fed into the reactor is selected so that there will be not too much liquid-solid entrainment at the outlet of top reactor. The embodiments of the present invention require a superficial gas velocity $U_{in}$ of less than 0.50 m/s; e) too high gas velocity and too tight arrangement of internal parts, especially heat exchange tubes will increase physical attrition of the catalyst. With the above limitation conditions, the superficial gas velocity ($U_{in}$) of large scale F-T synthesis reactor is generally in the range of 0.3-0.5 m/s. The reactor cylindrical body internal diameter can be determined by the following equation:

$$D_{in} = \sqrt{4\left(A_s + \frac{G^0}{U_{in}}\right)/\pi},$$

among which $D_{in}$ is the internal diameter of the reactor vessel (m), $G^0$ is the gas superficial volumetric flow rate (m³/s) at the bottom of the reactor under given reaction temperature and pressure, generally determined by the target capacity of a single reactor; $U_{in}$ is the inlet superficial gas velocity (m/s), $A_s$ is the occupied area by internal parts, e.g., reactor heat exchanger, on the cross-section of the reactor (m²); $\pi=3.1415926$.

The body of F-T synthesis three-phase suspension bed reactor has a cylinder height of 25-45 m vertically, preferably 28-40 m, suitable maximum superficial gas velocity is 0.50 m/s (based on reactor bottom cross-section area), optimized superficial gas velocity is 0.35-0.45 m/s. Suitable reactor internal diameter is 2-15 m, preferably internal diameter is 4-12 m.

The height of reactor, maximum superficial gas velocity and internal diameter of three-phase suspension bed reactor can be determined by the F-T synthesis catalyst conversion capability and reactor internal fluid dynamics behavior. These three parameters are interrelated. Under preferably selected conditions and scope, the reactor productivity based on $C_3^+$ hydrocarbons is 16-25 ton/h for 5 m internal diameter, 45-70 ton/h for 8 m internal diameter, 70-100 ton/h for 10 m internal diameter, 90-140 ton/h for 12 m internal diameter.

The gas distributor is located at the bottom of the reactor. There are two designs: direct introduction type and clapboard distribution type.

The direct introduction gas distributor is located on the surface of the reactor bottom shell, consisted of multiples groups of ring structures, in which the downward side surface keeps a 10-200 mm distance from the internal surface of the bottom shell of the reactor main body. Preferably, the downward facing side surface of the gas distributing component of the gas distributor keeps a 10-200 mm distance from the bottom shell cover internal surface, more preferably 30-150 mm. Each ring structure of the gas distributors is equipped with pipe fittings with gas sparger openings pointing downward, with diameter in the range of 1.0-8.0 mm, preferably 1.5-5 mm. This sparger opening can flush the internal surface of the reactor bottom shell with a gas velocity of 20-100 m/s; preferably, the diameter of the lateral downward gas sparger openings is in the range of 1.5-5 mm which can flush the internal surface of the reactor bottom shell at 30-90 m/s. At the same time, a ring shaped flow guiding baffle plates are set up between ring structure components, which are connected to the internal surface of shell and paralleled to the reactor axis. The height of the plate is 10-300 mm to assure the final upward gas flow vertically. In a circular or pie sliced region, all the mentioned components are combined and connected with the gas inlet pipe in this region via several conduits, to form a group of gas distributors.

Furthermore, the gas-liquid-solid three-phase suspension reactor may include 1 to 8 groups of the gas distributors, which are formed into a uniformly distributed gas distributor apparatus at the whole reactor bottom. All components are combined in a circular or pie sliced region and connected to the gas inlet pipe leading to the reactor via a plurality of pipes, all of them form a group of gas distributor. Ideally, 1-8 groups of gas distributors form gas distributor apparatus at the whole bottom of reactor, the gas inlet conduit for the reactor is evenly divided into 1-8 routes for gas introduction to these gas distribution components. The lower end of the gas distributor is connected to a small container located outside the reactor, which is used for purging liquid and catalyst particles entering into the distributor and eliminating the blockage of the gas distributor.

Where the gas distributor is clapboard type, its characteristics are the following: clapboards are setup just above the welding line between the lower part of the cylindrical vessel of the reactor body to separate a free space at the reactor bottom. Distributor pipe fittings are located on the upper side of the clapboard, which is closely connected to clapboards via the intermediate pipe facing down, then connected to the free space through the clapboard, the inlet gas conduits entered the free space are pointing downward to internal surface of the bottom shell. The liquid and catalyst particles permeate the clapboard distributor directly enter the free space below and are transported outside the reactor through the connecting pipe located at the bottom of the reactor shell cover, so that no blockage will happen to the gas distributor under all circumstances.

As mentioned previously, there still exists the problem of slurry backflow and accumulation in the distributor for other reactor technologies. Some technical solutions have been taken in the embodiments of the present invention to clean the accumulated slurry and guarantee no blockage of distributor under any circumstances.

In order to prevent slurry backflow in the reactor and accumulation in the distributor (i.e., slurry deposition problem), the embodiments of the present invention adopt a process to clean the accumulated slurry and guarantee no blockage of distributor under any circumstances. The ancillary system for handling deposited slurry is set up for the gas distributor at the bottom of reactor, the characteristic of this system is to connect the lowest point of gas distributor to a large space, where liquid level detection facility is equipped and can efficiently conduct out the deposited slurry. Also the larger space may be located outside of the reactor.

Specifically, the ancillary system for handling the deposited slurry equipped for the reactor includes: the connecting tube located at the lowest part of the distributed tube assembly is extended outside the reactor and connected to the liquid receiving container, which is adjusted and controlled by a liquid level control system; or the bottom shell cover space is taken as liquid receiving container and equipped with a set of liquid accumulation level indication and control system so that accumulated liquid can be discharged via automatic control or manual control system.

For different types of reactors, e.g., direct introduction type or clapboard type gas distributor, the slurry accumulation facility can be optionally selected from the above types.

The heat exchange internal components for the F-T reactor can be one-stage or two-stage primary heat exchanger. The heat exchanger is mainly designed according to the reaction heat and reactor operation conditions of the F-T synthesis reaction inside the reactor. Forced circulation of the pressurized boiling water (production steam) is used as heat exchanging medium. Reaction heat is indirectly removed from the reactor gas-liquid-solid suspension bed. When one-stage primary heat exchanger is used, reaction zone is mainly limited in the heat exchanger distributed region and additional heat exchange apparatus can be added to adjust temperature of the space where the liquid-solid filtration devices are located. Alternatively, heat exchange apparatus for gas-liquid (solid) separation can be thus added to cross the interface of the slurry bed and the upper gas phase space.

In terms of heat exchange components, firstly basic process conditions for heat exchange design should be taken into consideration, including process requirements on heat exchange area, flow velocity (two phase) inside heat exchange tube, pressure inside heat exchange tube (pressure and temperature for the saturated steam), reactor bed temperature, percent of reactor space taken by the heat exchangers, etc.

The gas-liquid-solid three-phase suspension reactor can be equipped with one-staged primary heat exchanger or two-staged primary heat exchanger. When two-staged primary heat exchangers are used, the upper primary heat exchanger is located above the liquid wax-catalyst separation region. The lower end of the primary heat exchanger at the lower part of reactor is positioned 0.1-3 m, preferably 0.3-2.5 m above the gas distributor.

When two-staged primary heat exchangers are used, the upper heat exchanger is located above the liquid wax-catalyst separation region. The heat exchange components can be setup at relatively large space between filtration separation apparatuses. For two-staged primary heat exchange design scheme, this can be taken into consideration together with upper heat exchanger. When one-staged primary heat exchanger is used, as the ancillary heat exchanger several groups of small heat exchange modules can be set up to guarantee temperature control of the filtration area.

In the gas-liquid-solid three-phase suspension bed reactor, conventional heat exchange components can be used for the heat exchanger, e.g., U-tube heat exchange components or central annular tube with rising tube heat exchange components (downcomer inside, annular space as one rising tube).

According to the practice in the field, in order to realize this large scale heat exchange in the reactor, multiple groups of heat exchange modules must be used, which consist of several groups of heat exchange components via a group of header pipes equipped with supporting components which are located at both ends of the header pipes and mounted on the supporting components of the reactor wall to form hanging-up structure in order to avoid stress accumulation problem structurally. One-staged heat exchanger is formed by multiple groups of heat exchange modules. Hot water and steam is used as coolant for removing reaction heat. The reaction heat can be recovered farthest by efficient design of heat exchanger in the embodiments of the present invention.

Herein the gas-liquid-solid three-phase reactor also includes a liquid-solid filtration separation device for separating solid catalyst and liquid heavy wax and removing the heavy wax product. The mentioned liquid-solid filtration separation device is used for separating solid catalyst and liquid heavy wax and removing the heavy wax. The filtration separation device is located vertically in the middle-upper reactor. When there is only one primary heat exchanger, the filtration separation device is located above the primary heat exchanger; when there are two primary heat exchangers, the filtration separation device is located between two primary heat exchangers;

Each group of filtration separation device consists of multiple filtering elements which preferably comprise of 12-60 filtration pipes; both ends of each filtering pipe are connected to the pipe assembly and extended outside reactor via intermediate delivery pipe following fluid uniform distribution principle. The low end delivery pipe is connected to the external wax discharge and pressure stabilizing system for removing filtered wax liquid, while the upper end delivery pipe is connected to the cleaning system for on-line cleaning of the filtering pipe;

And the filtering pipes can be kindred of metal filtering pipes, preferably the metal filtering pipes can be back blown; the passing through pores of the filtration media is 1-50 μm in diameter and filtering length is 0.3-3.0 m for the filtering pipes. The catalyst content in the filtered liquid wax can be decreased to less than 100 ppm after treatment by above equipment.

The filtering components may be kinds of metal or ceramic filtering pipe that can be back blown. According to the catalyst particle size distribution during synthesis, the pore diameter of filtering components is required to be smaller than 90% plus of the size of catalyst particle distribution. Generally commercial sintered/wound metal mesh or sintered porous metal, porous ceramic materials are selected as filtering media for the filtering components.

Preferably, the liquid-solid filtration device of gas-liquid-solid three-phase suspension bed reactor is located in the ring shaped region close to the wall in the reactor.

Preferably, filtration element of each group of the filtration separation device consists of 12-60 sets of filtration pipes, preferably 20-50 sets of filtration pipes. The length of filtration section of the filtration tubular components is 0.3-3.0 m, preferably 0.5-2.5 m. The filtration pipes may be commercial metal filtration pipes with pores in the range of 1-50 μm, preferably 10-30 μm.

The upper outlet conduit from the filtration device is for on-line cleaning with gas or clean liquid as cleaning media; the lower end conduit is used for removing filtered wax liquid. In the filtration zone, some inert parts (for example vertical tubes with both ends closed) can also be positioned in the space, which has not been occupied by the filters for keeping the highly turbulent conditions around the filtering pipes to increase filtration efficiency. The filtration device can keep the catalyst content in the F-T heavy products (liquid wax product) lower than 100 ppm. The solid content in F-T heavy products is less than 50 ppm in the optimized scheme, more often less than 5 ppm.

Because the catalyst in the filter cake is still highly active, it can be washed and recycled back to the three-phase bed to continue its catalytic function.

In the gas-liquid-solid three-phase suspension reactor, the filtration separation device is vertically located at the middle-upper part of the reactor, above the lower heat exchanger or between the two-staged heat exchangers; preferably the liquid-solid filtration separation device is located close to the annular region of the reactor wall.

The filtering element in the filtration device is kindred of metal or ceramic filtering pipe that can be back blown. According to catalyst particle size distribution during reaction process, the pore diameter distribution of the filtering element is required to be smaller than 90% plus of the size of the particle catalyst distribution. Generally, commercial sintered/wound metal wire or sintered porous metal/ceramic with the pore diameter of 10-30 μm can be selected as filter media in the filtering elements.

According to test results in the pilot plant, cooling of the filtration zone is needed during the three-phase bed reactor operation in order to keep uniform temperature across the filtration zone and heat exchange zone. Therefore, the upper heat exchanger is located in the central space encircled by the ring-shaped filtration zone. The structure herein simultaneously facilitates gas circulation and distribution in the filtration zone and guarantees efficient purging of the filtration elements by the three-phase flow to improve filtration efficiency. At the same time based on pilot test result, such filtration space in the large scale reactor is sufficient to accommodate filter element groups with 3-5 times filtering area of the actual running filtering area. Because of the fragility of filters, appropriate excess amount of filtration area and reactor structure maintenance convenience have been considered in the design. During the design of one-staged primary heat exchanger, the heat removal in the filtration zone needs dictated use of a small heat exchanger apparatus arranged according to optimized layout of the filters.

According to pilot test for arrangement in one group the filtration element, the minimum distance between external surface of filtration pipes is in the range of 20-50 mm. Too small a distance will cause channeling between filter cakes of filtering pipes and make it difficult to back flush and clean effectively, which leads to malfunction of filtration surface and impacts the increase of filtration load.

To guarantee the requirement of catalyst and heavy wax product separation, ancillary facilities can be added external of the reactor and combined with the internal liquid-solid separation system, which encompass wax filtrate receiver and pressure stabilization vessel located outside of the reactor in order to assure efficient operation of the filtration separators inside of the reactor, and cleaning system located outside of reactor for use combined with filtration separator inside reactor. The filtration separation device inside reactor is connected to the wax discharge and pressure stabilization systems and cleaning system via main header, which is used for removing filtered wax liquid. The upper outlet conduit is connected to cleaning system for on-line cleaning of filtration pipes.

Excellent catalyst and wax separation results can be achieved if the internal and external facilities properly configured in the reactor with solid content in the filtered F-T heavy products less than 5 ppm, and filtered catalyst can be efficiently used.

In order to increase liquid recycle volume and promote catalyst distribution in the whole suspending slurry bed, one or multiple flow conducting pipes are set up inside the reactor to enhance the recycle of the three-phase slurry along the reactor axis, to prevent local recycle caused by relatively high reactor bed and internal members inside the reactor, to improve the axial distribution of catalyst inside the three-phase suspension bed reactor, at the same time to provide heat exchange between two sections of heat exchangers, which is beneficial to the heat exchange of whole reactor, and to prevent overheat or temperature out of control close to the space at the bottom inlet.

The flow guidance device not only increases the liquid recycle volume and facilitates uniform distribution of catalyst, but also overcomes reactor local recycle formed due to sectioned internal members. In addition, it can integrate the loading of the two-staged heat exchangers. The flow guidance device can be one or multiple groups which are located at a position inside the reactor three-phase suspension bed and close to reactor wall, which is used for heat integration of the two-staged heat exchangers and for increasing the recycle volume of the suspension liquid to improve the catalyst distribution axially along the reactor.

The design principles of the flow guidance device are: (1) reasonable internal diameter of the flow guidance pipe to ensure the large recycle volume of the liquid-solid phase inside reactor, (2) the recycle inside the flow guidance pipe can efficiently lead to improved catalyst distribution axially inside the reactor, (3) the position of the flow guiding device takes the efficient recycle of the two-staged heat exchangers into account, and (4) the flow guidance pipe can supply a large amount of liquid to the reactor bottom adiabatic space from the lower part heat exchanger and thus can realize the heat removal at the reactor inlet by the lower heat exchanger.

In order to increase the separation efficiency of the gas-liquid-solid three-phase, especially to reduce the catalyst solids carried by the gas stream leaving the reactor and thus reduce the catalyst solid contamination in downstream condensates, embodiments of the present invention also suggest equipping a mist separation device at the upper space of the reactor. The mist separation device includes a primary mist separation device located at upper part of the reactor and a secondary mist separation device immediately out of the reactor.

Specifically, the primary mist separation device inside reactor is located in the gas-phase region of the reactor and above the upper heat exchanger, which forms into a recycled condensate baffle plate structure with the main header configuration of the upper heat exchanger and combines the condensation effects of the heat exchanger to gas flow, thus it can carry out the first separation of the mist with entrained solid catalyst in the gas flow. A secondary mist separation device is located inside the reactor at the outlet. Its structure is a cylinder condenser connected to the reactor outlet pipe, which is a cylinder structure formed by 1-8 layers of compactly arranged heat exchanging pipes equipped with a cone-shaped collector at the bottom of the condenser. Whenever the mist entrained gas flow passes the heat exchanging pipe spaces, condensation and collisions occur, the mist particles are grown and captured at the heat exchanging pipe wall which form into a liquid film and flows into the bottom cone-shaped collector, then flowed downward through the back flux delivery pipe located at the bottom of the cone to the upper space above the primary baffle plate consisted of upper heat exchanger main header, to form liquid back flux and improve separation efficiency.

With the use of mist separation unit, the separation efficiency is significantly increased, which can reduce the catalyst content in the heavier primary condensate products outside the reactor to less than 2 ppm and thus ensures the further processing of the F-T synthesis products.

In order to further increase the efficiency of the gas-liquid-solid three-phase separation and reduce the catalyst content in the condensates, embodiments of the present invention also provide options for installation of supplemental devices outside of the reactor, e.g., the pre-condensate mist separation system located immediately at the reactor outlet.

As an external supplemental facilities for the reactor, the pre-condensate mist separation system located at the reactor outlet which includes a pre-condenser, a gas-liquid separator, a small liquid receptor and relevant automatic valves. The gas flow temperature passes this system can drops 5-10° C., the solid content less than 2 ppm in its downstream condensates.

Specifically, an optionally selected pre-condensate/separation system can be located at the reactor outlet, which can pre-condense the gas from the reactor, its characteristics are the following: it can decrease gas flow temperature by 5-10° C.; it is a small shell-and-tube heat exchanger and waste heat boiler system, where condensed gas flow is transported downstream via a gas-liquid separator. The bottom of the separator is connected to a small liquid receptor with a connecting pipe which is equipped with a manual and an automatic shutoff valve. The bottom of the liquid receptor is connected to the reactor via the shutoff valve. The liquid in the receptor can be periodically pressurized and transported to the upper part of the three-phase reactor bed, or optionally transported at low pressure to contaminated product intermediate tank for further processing. The pre-condenser system can ensure the solid content in the downstream condensates to be less than 2 ppm, the function of which is similar to the mist separator unit located inside the upper reactor.

In practice, either one of the pre-condenser separation system and the mist separation device in the upper of reactor can be optionally used or simultaneously used.

Preferably, the gas-liquid-solid three-phase suspension bed reactor includes six major parts with the following arrangement: 1) vertically a straight cylinder shaped reactor main body with a height of 25-45 m; 2) the direct introduction type or clapboard type gas distributor located at the reactor bottom for distributing gas and preventing catalyst settling at the reactor bottom, and the slurry handling ancillary system for the gas distributor; 3) the primary heat exchanger located below reaction zone, and optionally selected upper primary exchanger crossing the three-phase region and the gas phase region; or if only one-staged primary exchanger is used, the ancillary heat exchanger for filtration heat removal is located at the upper part of the separator zone with its heat exchange apparatus extended into the space between separators; 4) multiple groups of solid catalyst-liquid heavy products separator located above the lower heat exchangers or between two stages of primary heat exchangers, which are distributed in the annular region close to the reactor wall; 5) multiple groups of flow guidance pipes located inside the three-phase suspension bed in the reactor and close to the reactor wall, which are used for improving catalyst distribution axially along the reactor; 6) the primary condensing type mist separation device combined with the upper primary exchangers or ancillary main header pipes of the exchangers, the secondary mist separator at the upper outlet, and optionally selected precondensate mist separation system at the upper reactor outlet; in addition, the other external reactor supplemental devices are optionally set up in combination with the mentioned components of the reactor.

The gas-liquid-solid three-phase suspension reactor in embodiments of the present invention is equipped with corresponding external supplemental facilities, which include: 1) the reactor external filtered wax receptor and filtration pressure stabilizing system; 2) the reactor external cleaning system in combination with the liquid-solid separation system in the reactor; 3) the back flux separation apparatus which is combined with the upper heat exchange apparatus and used for conducting away the upper gas in the reactor, e.g., pre-condensing-separation system at the reactor outlet, etc.; and 4) the ancillary system for handling the deposited slurry device for gas distributor at the bottom of the reactor.

Specifically, the reactor external supplemental devices in combination with the above mentioned members refer to the following external supplemental facilities:

1) the reactor external filtered wax receptor and filtration pressure stabilizing system for efficient operation of the reactor internal filtration separator;

2) the reactor external cleaning system in combination with the liquid-solid separation system inside the reactor.

There is an external supplemental facilities designed for wax filtration in the reactor, this is a reactor external filtered wax receptor and filtration pressure stabilizing system which comprises a liquid wax receptor and its liquid level control system, a gas pressure buffer tank, a pressure stabilizing tank and precision pressure control system. The system can be started up with automatic or manual methods.

Specifically, the liquid level inside the three-phase reactor has to be kept in a certain range during F-T synthesis. Based on which, the liquid wax and catalyst separation can be carried out according to suitable procedures by multiple sets of filtration devices inside the reactor and ancillary systems outside the reactor.

During reactor operation, the F-T liquid wax and part of the gas entrained enter the liquid wax receiving tank via the delivery pipe and the opened shutoff valve, and finish the gas-liquid separation therein. The liquid stays at the receiving tank bottom, while gas passes through the delivery pipe and enters the gas pressure buffer tank. The liquid at the bottom is sent to downstream for further treatment. The liquid level in the liquid wax receiving tank is kept at a specific value with a liquid level control system.

The function of pressure control in maintaining the normal operation of the process is achieved by the precision pressure control system. The accumulated liquid inside the gas pressure buffer tank is timely discharged by the automatic control system located therein.

The reactor is equipped with an external cleaning system used in combination with the reactor internal liquid-solid separation system as cleaning system, which comprises a gas cleaning system and/or a liquid cleaning system.

The gas cleaning system mainly includes a gas compressor, a gas heater and a gas buffer tank with thermo insulation function, synthesis gas, nitrogen, etc. can be used as cleaning medium, preferably the cleaning gas is the clean synthesis gas from the F-T synthesis.

The liquid cleaning system mainly includes a hot oil pumps and a cleaning liquid metering pumps with heating and thermal insulation function, which liquid wax and synthetic wax can be used as cleaning medium, preferably synthetic wax is used as the cleaning medium. More specifically, the F-T distillate oil post the downstream hydrogenation with boiling point from 300-380° C. as cleaning medium.

Specifically, synthesis gas, nitrogen or liquid wax, synthetic wax liquid media, preferably synthesis gas and synthetic wax media can be used as liquid media for the above mentioned cleaning system, which can be alternatively and interchangeably used.

The cleaning system comprises a compressor which can generate synthesis gas (syngas) pressure higher than reactor pressure (maximally 0.8 Mpa higher than reactor pressure), a gas heater and a gas buffer drum. The gas buffer drum is connected to the upper conduit of the catalyst-wax separation device of the reactor. The conduit is equipped with at least one automatic shutoff valve for cleaning gas source on/off. Also included in the system is a receiving container of the separated liquid product and the gas pressure buffer container connected to the gas phase in the upper part of the receiving container through pipe connection. A continuous gas feeding line from the synthesis loop equipped with restriction orifice plate and a gas emission line equipped with automatic control valve and shutoff valve is located in the upper part of the pressure buffer container in order to realize precise control of the filtration pressure difference. The pressure buffer container not only stabilizes the pressure of the filtered liquid side, but also separates small droplets of heavy wax entrained in the discharge gas from filtrated liquid entering the liquid container; therefore preventing the disturbance of heavy condensates to the pipe for discharging gas to flow into the buffer drum.

When cleaning the filtration devices, the F-T distillates (e.g. 300-370° C. distillates) after hydrogenation can be conveniently used as cleaning media. A liquid medium transport pump and a liquid buffering drum are needed for on-line cleaning of filtering components.

In this separation system, the liquid level control and product separation can be conveniently realized by adjusting the number of filter elements, filtration duration and filtration pressure difference.

In the gas-liquid-solid three-phase suspension reactor of the present invention, the F-T synthesis catalyst used can be any common catalysts for the reaction, including the known catalysts and their improved models in the current technologies, or new catalysts for the reactions, e.g., the iron-based catalyst of low temperature slurry bed process at reaction temperature of 240-250° C., with performance reaching 0.3-0.6 kg $C_3^+$/kg,h, methane selectivity of 2.0-5 wt %, and $C_2$-$C_4$ selectivity of 4-12 wt %. The lowest performance is 0.3-0.5 kg $C_3^+$/kg·h, methane selectivity of 2.5-4.0%, and $C_2$-$C_4$ selectivity of 6.0-12 wt % (based on total hydrocarbons, wt %). Also the iron based catalyst used for high temperature slurry bed process of reaction temperature from 250-290° C., with performance reaching 0.4-0.9 kg $C_3^+$/kg·h, methane selectivity of 2.0-4 wt %, and $C_2$-$C_4$ selectivity of 3-10 wt %.

The minimum performance is 0.4-0.8 kg $C_3^+$/kg·h, methane selectivity of 2.5-4.0%, and $C_2$-$C_4$ selectivity of 5.0-10.0 wt % (based on total hydrocarbons, wt %).

For example, a series of F-T synthesis catalysts for slurry bed reactor can be used as F-T synthesis catalyst in the gas-liquid-solid three-phase suspension reactor of the various embodiments of present invention, which has been invented by the Shanxi Coal Chemistry Research Institute, Chinese Academy of Science and produced by Synfuels China Technology Company Ltd. The catalyst can be used in the low temperature slurry phase process (240-250° C.), or at relatively high temperature (250-290° C.) in the high temperature slurry phase process. The proprietary iron-based catalysts used in the low temperature slurry phase reactor process are found in Chinese patents: CN1128667C, CN1159098C, CN1245255C, CN1260007C and improved catalysts thereafter. The proprietary iron-based catalysts for the high temperature slurry phase reactor process are found in Chinese patents: CN1199730C and CN1270822C and improved catalyst thereafter. However, the F-T synthesis catalyst is not limited to the catalysts described herein above, but also includes any new F-T synthesis catalysts used in all relevant technical fields.

As the catalyst has excellent conversion capability, the reactor can reach upper limit of gas handling capability (synthesis gas conversion of 90-96% for a synthesis loop) when catalyst weight concentration in the three-phase suspension bed is less than 35%, usually the catalyst concentration is 10-20%, which is the basic limiting condition for determining reactor internal diameter and production scale.

Compared to known similar types of reactors in prior art, the reactor of the embodiments of the present invention has the following characteristics:

1) simple structure of the inlet gas distributor and the supplemental system thereof, which can realize gas distribution, efficient slurry fluidization and prevent distributor blockage in all circumstances;

2) flexible heat exchange-temperature control system that can guarantee complete and efficient F-T synthesis reaction in the slurry bed reactor;

3) highly efficient liquid-solid separation system integrated into the overall reactor structure and placed on one layer that leads to minimum solid content in the filtered heavy F-T products; and therein the catalyst in the filter cake can be recycled back to the reactor bed and kept at high activity; and 4) enhanced catalyst distribution and efficient mist separation measures taken in the three-phase suspension bed F-T synthesis reactor design, to ensure the reliable process functionalities of the F-T synthesis reactor of the embodiments of the present invention, and a simple structure and operation with reduced reactor cost and operation.

The reactor of the embodiments of the present invention can be used for F-T synthesis process that converts syngas (CO+$H_2$) to hydrocarbons and small amount of organic oxygenates (methanol, ethanol, acetic acid, aldehyde, acetone, ethyl acetate, etc) in presence of the catalysts and in the low temperature slurry phase process or high temperature slurry phase process under suitable temperature and pressure.

Therefore, another object is to provide an efficient F-T synthesis process in the reactor to convert syngas via F-T synthesis reaction with the presence of F-T synthesis catalysts under desired temperature and pressure.

Taking the fluid dynamics characteristics of the three-phase suspension bed and the F-T synthesis catalyst used into account, turbulent operation condition is adopted in the present reactor, with a reasonable height above 30 m and industrially operated reactor diameter of more than 0.28 m. At the same time, a series of technical issues such as liquid-solid separation, heat exchange and reactor temperature control, gas distribution and removing foam/mist effect, mist entrained in the reactor outlet gas flow were also considered in the solution to realize optimized configuration of the ancillary system facilities.

For example, during the design of the small F-T synthesis system for obtaining industrial process data, the minimum reactor internal diameter should be larger than 0.28 m, generally more than 0.3 m in order to obtain F-T synthesis results which have corresponding relationship with that of the large scale process data (including reactor internal fluid dynamics behaviors, the effects of the heat exchangers, separation and gas distribution parts located inside reactor on reaction). Too small reactor height can make it difficult in achieving stable reactor operation, accurate liquid level control and liquid overflow prevention which can damage the operation result due to liquid flooding. Therefore, the minimum reactor height used is 30 m in scale. For these project objectives, too large reactor dimension only increases the project operation cost.

Another example is that the single reactor production capacity should be as large as possible during industrialization process design, and economically ideal scale should be above 500,000 ton/year in liquid products. However, this is limited by the reactor manufacturing and site conditions and thus the scale of the reactor in the embodiments of the present invention is determined by the requirements and relevant execution engineering conditions.

Following the above design principle, good results have been obtained from various tests in developing coal to liquids industry using a small scale reactor and an intermediate scale reactor in transitional industrial demonstration projects.

BRIEF DESCRIPTION OF THE DRAWINGS

FIGS. 3 and 4 show that there are four sets of gas distributors in the reactor.

DETAILED DESCRIPTION OF EMBODIMENTS OF THE INVENTION

The invention can be better understood with reference to the following drawings and description on the three-phase suspension bed F-T synthesis reactor, however, it is not limited the present invention in any means.

Figure 1:
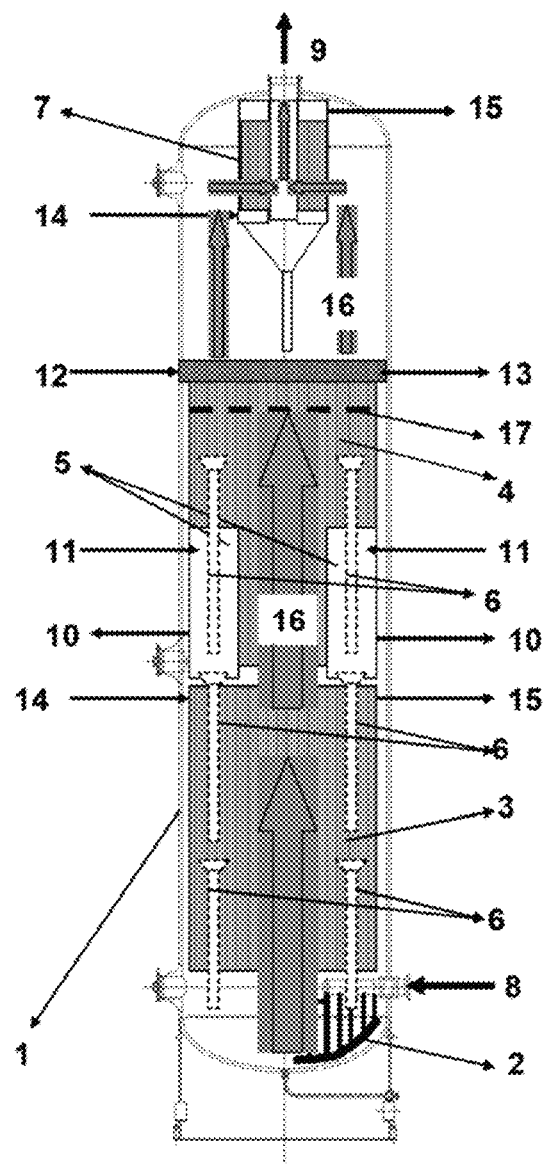
FIG. 1 is a schematic view of the large scale three-phase suspension bed reactor structure and process principles.

The three-phase suspension bed F-T synthesis reactor according to an embodiment of the present invention is a slurry bed reactor and its ancillary systems is designed according to production scale and catalyst characteristics. FIG. 1 shows the structure principle of the three-phase suspension bed reactor. The reactor and its ancillary systems (FIGS. 22-25) shown in FIG. 1 includes: 1) the main body of the large F-T synthesis reactor; 2) the gas distributor 2 for gas distribution and for preventing catalyst settling at the bottom of the reactor, and reactor external ancillary system for preventing gas distributor blockage (FIG. 24, 25); 3) the lower part heat exchangers 3 in the reactor, and optionally selected upper heat exchangers 4, or if necessary, ancillary heat exchangers for heat removal from filtration region; 4) the liquid-solid separation system 5 inside the upper-middle part of the reactor and located between the two stages of the heat exchange apparatus, and the equipped pressure stabilizing and discharging and cleaning system outside the reactor (FIG. 22); 5) the flow guiding device 6 located inside the reactor for overcoming the reactor inside local recycle due to separate staged internal members, and promoting catalyst uniform distribution and integrating the heat removal of two stage heat exchangers; 6) the backflow separation apparatus 7 for integrating the reactor upper gas delivery space and upper heat exchange members, and the pre-condensate mist/foam separation system (FIG. 23) located at the gas stream outlet outside the reactor.

The assembly structure of the three-phase suspension bed F-T synthesis reactor is shown in FIG. 1. During F-T synthesis, the synthesis gas ($CO+H_2$) 8 with a composition according to process design passes through the gas delivery pipe into the gas distributor 2 located at the reactor bottom, which passes through the openings of the gas sparger of the gas distributor and strongly purges the bottom shell surface, and rebounds and forms into bubbling upward gas flow 16 uniformly distributed over the reactor cross section, which can be redistributed by internal members like heat exchangers 3, 4 and separator 5, etc. and then forms a churn turbulent flow field in the reactor gas-liquid-solid suspension bed and realize mass transfer, heat transfer, and F-T synthesis reaction generating large amount of reaction heat. At the middle-upper part of the upper heat exchanger, the gas stream including un-reacted synthesis gas and gas products generated from chemical reactions leaves the gas-liquid-solid suspension bed via the gas-liquid interface 17, and enters the gas phase space in the upper reactor. Next, goes through the preliminary mist separation through the clapboard structure (12-13) by the top main header pipes of the upper heat exchanger 4. The gas flow entrained from the preliminary mist separation further flows towards the reactor outlet, and enters the separation apparatus 7 connected to the top reactor outlet from the ring-shaped lateral surface comprising lateral cool pipes backflow separation component. During passing through the ring-shaped lateral surface, the gas flow is cooled down and higher boiling components are partially condensed, which form a downward flowing liquid film over the cooling pipe group by the entrained liquid foam and condensed liquid generated from the collisions between the gas flow and the cool surface of these tubes. Thus effective separation of mist/foam in the outlet gas is achieved. The gas flow stream 9 where mist/foam and condensate have been removed then exits the reactor from the outlet of the reactor top. During the F-T reaction process, heavy products can accumulate in the reactor, which increases liquid level 17. In order to stabilize the liquid level in the three-phase suspension bed reactor, the heavy F-T products in the suspension liquid must be discharged from the reactor, while the solid catalyst suspended in the three-phase bed is kept inside the reactor. In the two-staged primary heat exchanger design of an embodiment of the present invention, multiple groups of solid-liquid separation filters 5 are located between the upper stage and lower stage heat exchangers, where the liquid is discharged from the reactor via the filter porous filtration surface of filtration devices 10. The liquid level 17 is controlled by adjusting the number of filters used. The filters can be programmatically controlled to stop filtration for purging. The purging liquid 11 can be clean hot gas or liquid. The heat removal is realized by passing pressurized recycle water 12, 14 inside the heat exchange pipes of the two-staged heat exchangers 3, 4 and reactor top backflow condensate separation component 7. The steam 13, 15 generated in pipes exits the reactor and enters the steam drum.

Figure 2:
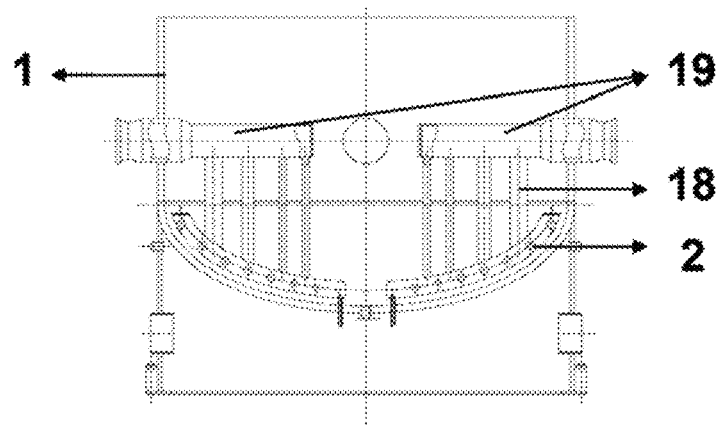
FIG. 2 is a lateral schematic view of the direct introduction gas distributor at the bottom of reactor.
Figure 3:
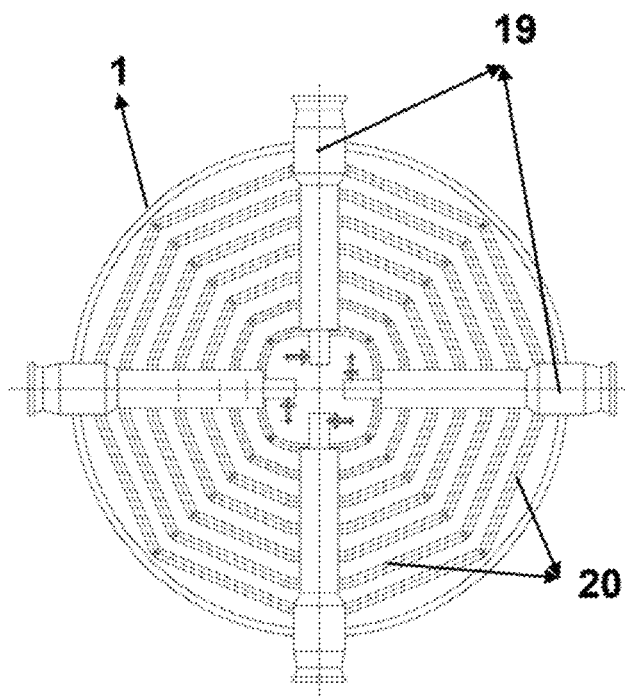
FIG. 3 is a layout schematic view of the direct introduction gas distributor on cross-section.
Figure 4:
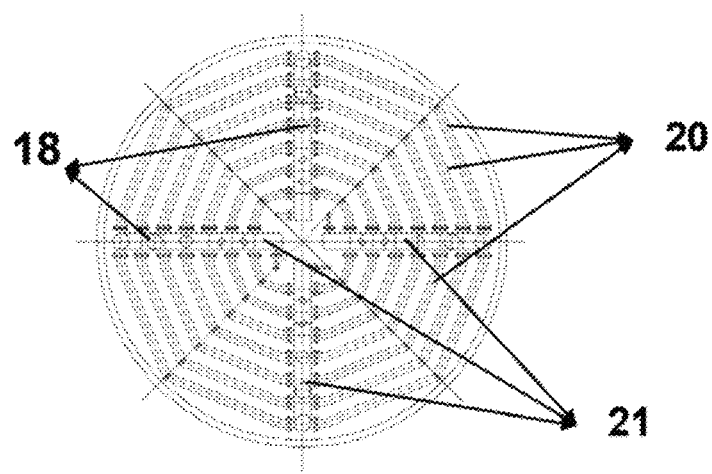
FIG. 4 is a layout schematic view of the direct introduction gas distributor cross-section.
Figure 5:
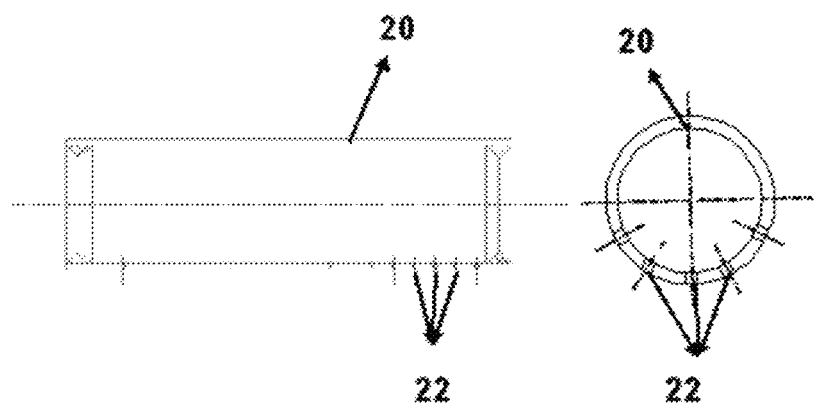
FIG. 5 is a schematic view of structure of the gas delivery pipe and gas sparger orifice located on the pipe for the direct introduction gas distributor.

Depending on the reactor diameter, the gas distributor 2 (see FIG. 1) may comprise one or multiple groups of gas distributors, with structural drawings as shown in FIGS. 2, 3 and 4. The distributors form a segmental shape over the reaction cross section, which are distributed on the overall elliptical or spherical surface of the reactor bottom following the shape of reactor bottom internal surface. Each group of distributors is connected to the main gas inlet 19 via a plurality of gas conduits 18. The distributor in FIG. 3 comprises a plurality of pipes 20, which are firstly connected to main header 21 (FIG. 4), then connected to gas inlet 19 via a plurality of gas conduits 18, as shown in FIGS. 3 and 4. To achieve uniformly distributed gas feeding, gas distribution outlet port 22 (gas injection orifices) facing internal surface of the bottom shell cover of the reactor are located on the gas distributor, as shown in FIG. 5. The size and number of the abovementioned gas injection pores are determined by the gas velocity passing through the pores. In order to assure the gas distribution and effective gas purging to the internal surface of the reactor bottom and prevent catalyst deposition thereof, the gas flow rate through the pore is generally large than 25 m/s. Embodiments of the present invention take a gas velocity of less than 100 m/s, generally 30-90 m/s, whereof the pressure drop of the gas distributor is 0.03-0.25 Mpa. In addition, the optimized gas injection pore size is 1.5-5.0 mm. Too large pores may make the catalyst enter into the distributor pipes and deposit thereof leading to partial or complete blockage of the pores, especially when the fluctuation occurs during operation or startup/shutdown; while too small ore size may increase complexities during manufacturing.

Figure 6:
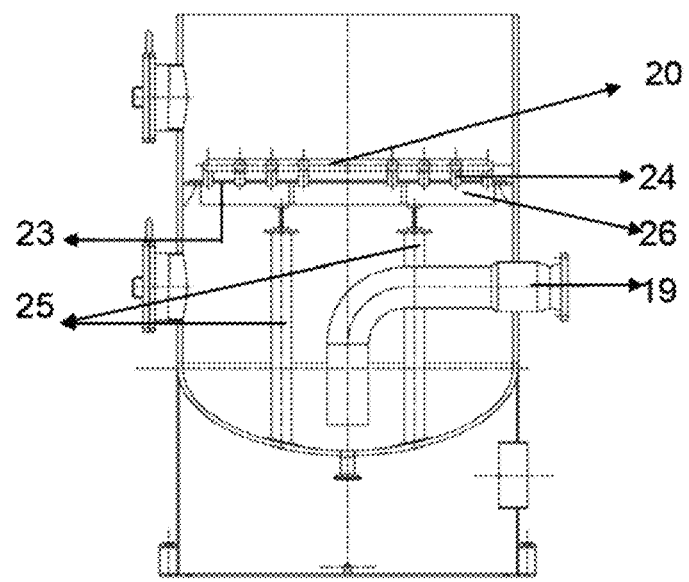
FIG. 6 is a schematic view of lateral structural of the clapboard distributor type gas distributor at the bottom of reactor.
Figure 7:
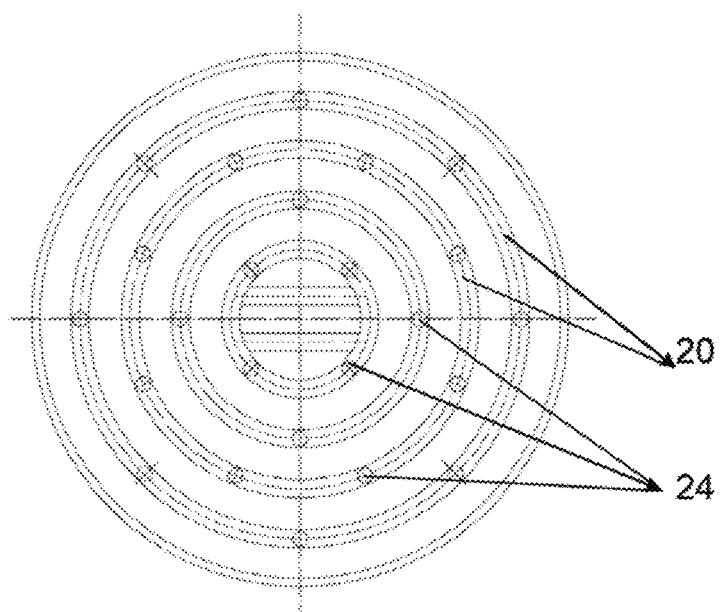
FIG. 7 is a layout schematic view of the clapboard gas distributor at cross-section of the reactor bottom.
Figure 8:
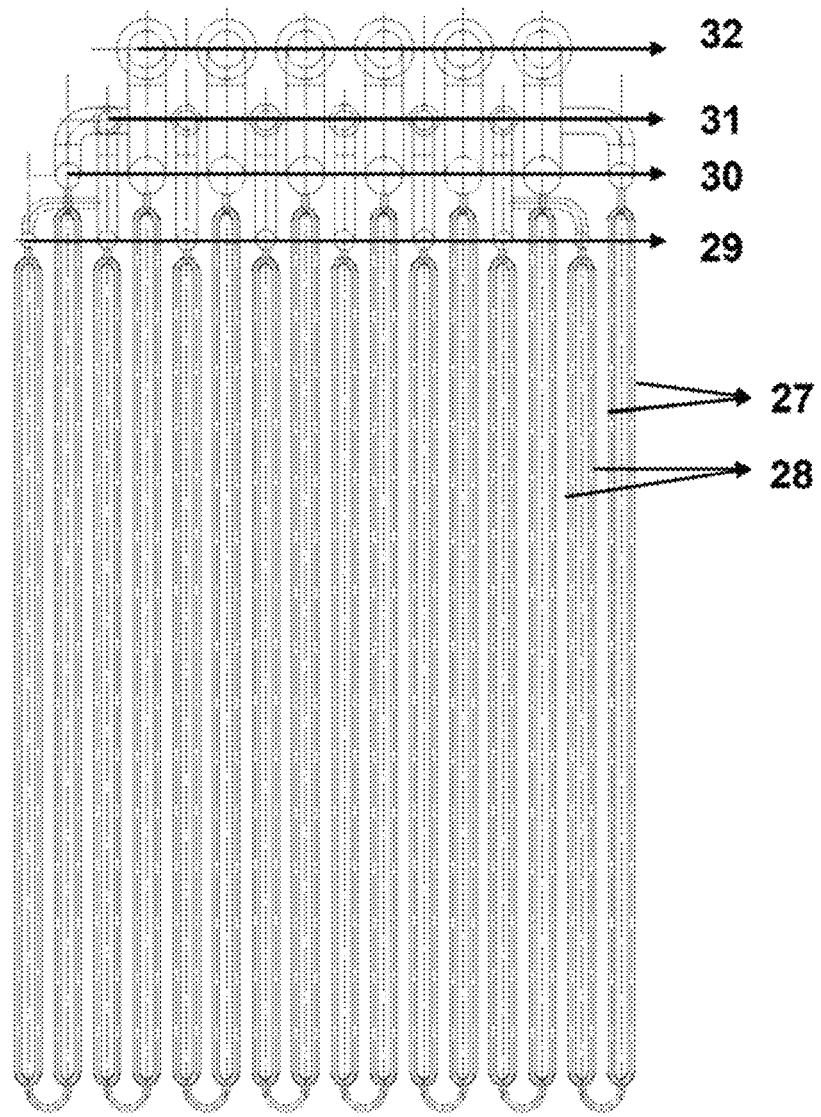
FIG. 8 is a structure schematic view of lower heat exchanger, in which all heat exchanging pipes are combined and connected to the main header.
Figure 9:
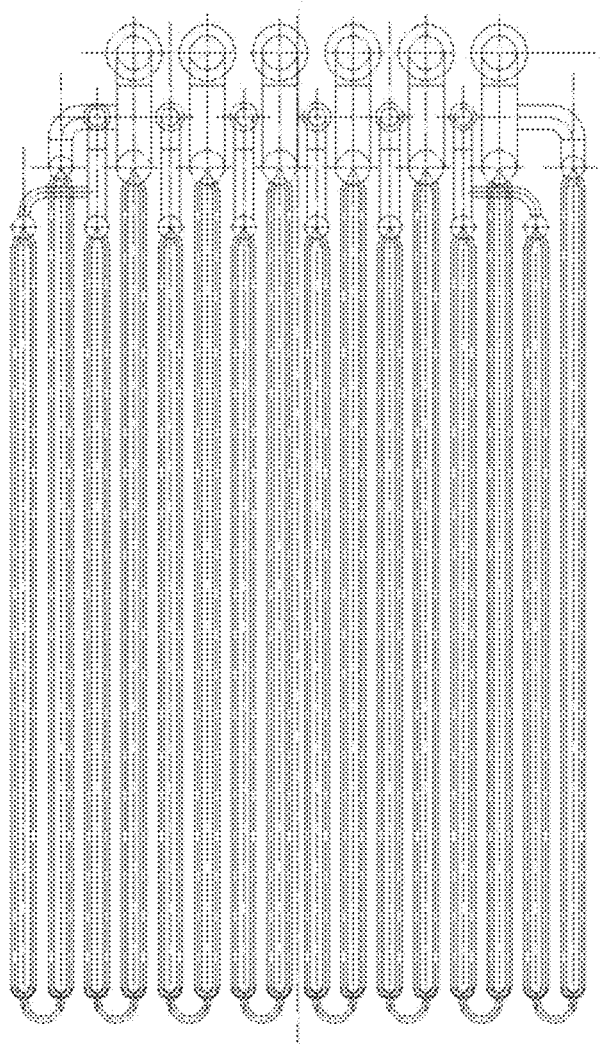
FIG. 9 is a structure schematic view of lower heat exchanger, in which all heat exchanging pipes are connected to the main header separately.

Another design for the gas distributors of the large three-phase suspension bed reactor of embodiments of the present invention adopt the clapboard type gas distributor, whose connecting structure and cross section diagram are shown in FIGS. 6 and 7 respectively. The clapboard 23 separates the reactor bottom shell cover from the reactor bed. The clapboards are used for primary gas distribution via the gas distributors 20 installed on the top of the clapboards. The above mentioned clapboards can be flat designed properly or a elliptical spherical shell cover designed according to pressure. Flat clapboard designs are shown in FIGS. 6 and 7.

In the present design, the gas entering the reactor inlet conduit 19 goes down to the reactor bottom space separated by the clapboards 23, then enters the gas distributor components via conduit 24 connected with the gas distributor component 20 on top of the clapboards, and enters three-phase bed in the reactor through the lateral downward injection orifices of the distributor components. For large reactor, the flat clapboards need mechanically strengthening, where beam 26 and vertical column 25 are important structural components. Relevant mechanical standards should be followed in the design of large clapboard in order to eliminate thermal stress.

The component structure of the heat exchange system is shown in FIG. 8-14.

As shown in FIG. 1, the heat exchange internal components inside the reactor may be arranged as one-stage or two-stage primary heat exchangers 3 and 4. The heat exchangers are designed according to the reaction heat released from F-T synthesis at the operation conditions. Forced recycling of pressurized boiling water as heat exchange medium inside heat exchange tubes for steam production is used for reaction heat removal, by which reaction heat is removed from the reactor gas-liquid-solid suspension bed as steam by-product. When one-stage primary heat exchanger is used, the reaction zone is primarily limited inside the heat exchanger zone, where small heat exchange component groups can be added to adjust the temperature of the space taken by liquid-solid filtration devices. Optionally, heat exchange components can be added above the gas-liquid interface for gas-liquid (solid) separation.

In terms of the structure of heat exchange components (shown in FIGS. 8, 9, 10 and 11), basic process limits in heat exchanger design have been considered, including the flow rate inside heat exchange tubes (two phases of water and steam), pressure inside the heat exchange tubes (saturated steam pressure and temperature), the bed temperature, the percentage of reactor space taken by heat exchanger tubes, etc.

For two-stage primary heat exchangers design, the lower heat exchange tube groups (structure shown in FIGS. 8 and 9) are completely immersed inside the gas-liquid-solid three-phase region. Part of the upper heat exchangers (FIGS. 1, 10 and 11) are located inside the three-phase region, while the other part located inside the gas phase region at the upper space of the reactor. The configuration of the upper heat exchanger partially exposed to the gas phase space is thus arranged with consideration of the environment of partial condensation inside the reactor upper space, at the same time the main headers of the upper heat exchanger header pipes are designed in an array taking a relatively large percentage (70-90%) of reactor cross section area. "Clapboards" formed by the main header piping of the upper heat exchange can be used in the array to play the role of primary separation of mist/foam entrained in the gas stream from the reaction zone. The heat exchange area is exposed to the gas phase space inside upper reactor to keep the temperature difference between reactor outlet and reaction bed within a certain range (2-6° C.), which can be optimized by tuning the reactor liquid level. Uniform distribution can be achieved for the heat exchange pipes of the heat exchangers inside the whole heat exchange space (FIG. 12). Embodiments of the present invention may employ the coupling of two stages for the two-stage heat exchanger design, which is realized by flow guidance pipes 6 inside the reaction space (see FIG. 1) vertically placed close to the reactor wall for strengthening the liquid recycling of the two-stage heat exchange space. The lower heat exchangers inside the whole reactor are the most important for heat removal, as in typical industrial reactor and under churn turbulent operation conditions, roughly 55-75% reaction heat is removed via the lower heat exchangers. In this regard, the heat exchange area of the lower heat exchanger has been extensively optimized to simultaneously realize a larger heat exchange area inside reactor and heat coupling of upper and lower heat exchangers, whereof the liquid-solid flow guidance pipes inside the heat exchange area is a means for realizing the abovementioned heat integration. Because of the strengthened liquid-solid suspension phase recycling by flow guidance pipe 6 (see FIG. 1), the load difference between upper and lower heat exchangers is decreased while the reactor operation flexibility is increased. As the liquid-solid separation device is located inside the space between upper and lower heat exchangers, the flow guidance pipe 6 can also play roles for enhancing the heat removal from this space. Thus the F-T synthesis reactor reaction heat is distributed over the whole reaction zone naturally by the structural restrictions. In addition, the design of strengthened heat integration leads to greater flexibility in temperature control, and especially for this case, the steam generated by the reaction heat removed by the two-stage heat exchangers can stabilized at the same pressure level, which is beneficial to the enhancement of the overall process efficiency (for the F-T synthesis catalyst series in the present invention, the low temperature steam pressure is 1.8 MPa, high temperature steam pressure is 4.0 MPa).

The heat exchange component of the heat exchangers in embodiments of the present invention can use U-tube tube or annular tube structure.

The U-tube tube structure (see FIGS. 8, 9, 10, and 11) with the design of distributing and gathering pipes can realize uniform distribution of heat exchange tubes across the reactor cross section. U-tubes (FIG. 8, 10) are jointly or separately connected to the inlet distribution pipes (single pipe for downward heat exchange pipe 28) or outlet main header (for uprising heat exchange pipe 27). Header pipes 29 and 30 are connected to the inlet 31 and outlet 32 conduit of the water-steam system via the transitional pipes. During operation, hot water from recycle water pump enters every group of main pipe 29 via inlet conduit 31 and transitional pipe components, from where it is distributed and enters heat exchange tube arrays 28. Afterwards it flows downward and is heated and partially vaporized into steam. The hot water flows downward to the bottom and passes the U-type elbow and enters the uprising tube arrays 27. It then flows upward to the steam-hot water main header 30 and passes the transitional pipe to the steam-hot water outlet pipe 32, where it is connected to the reactor wall receiving pipe and is extended to the outside of the reactor for entering in the external steam-hot water drum.

Figure 10:
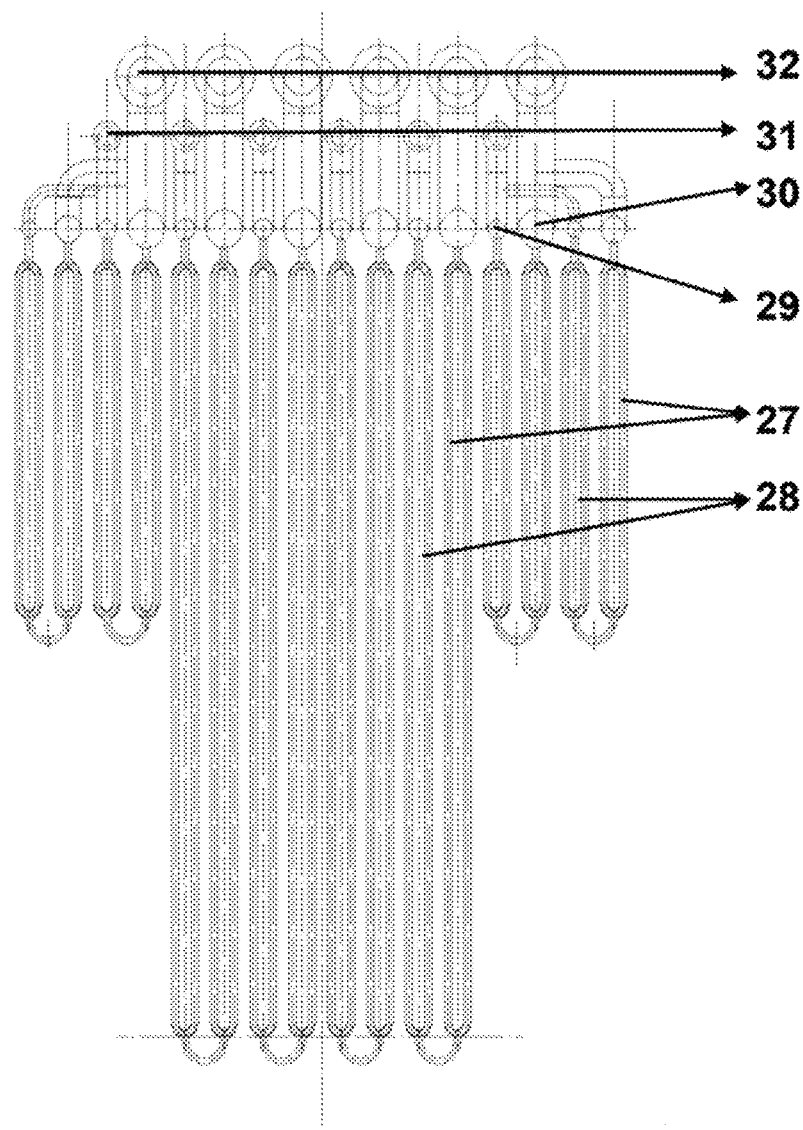
FIG. 10 is a structure schematic view of upper heat exchanger, in which all heat exchanging pipes are combined and connected to the main header
Figure 11:
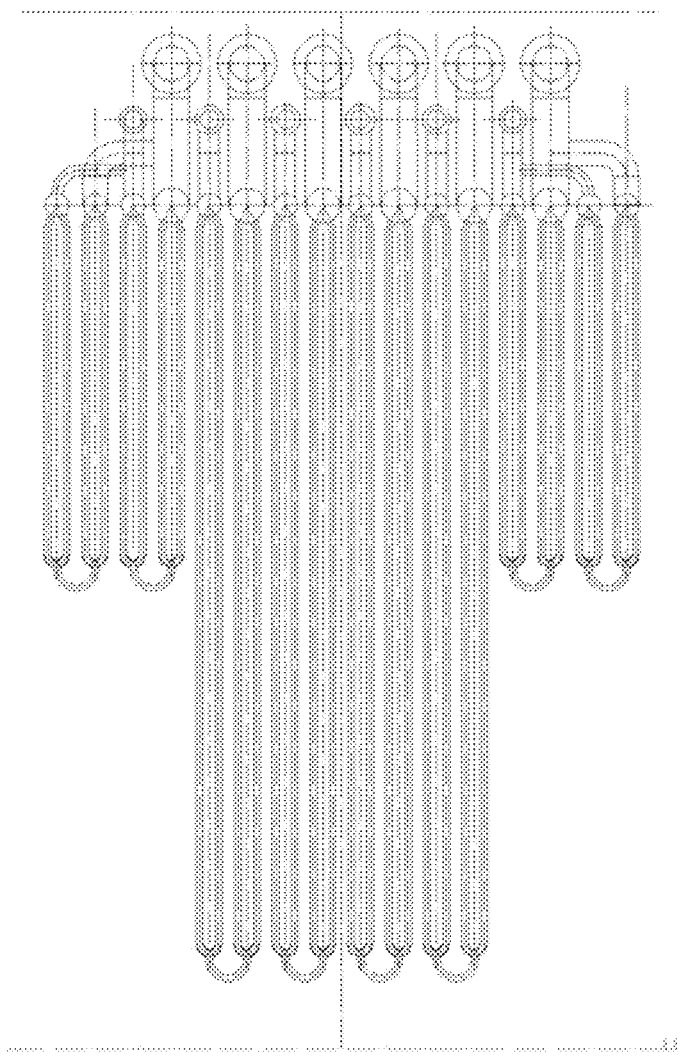
FIG. 11 is a structure schematic view of upper heat exchanger, in which all heat exchanging pipes are connected to the main header separately.
Figure 12:
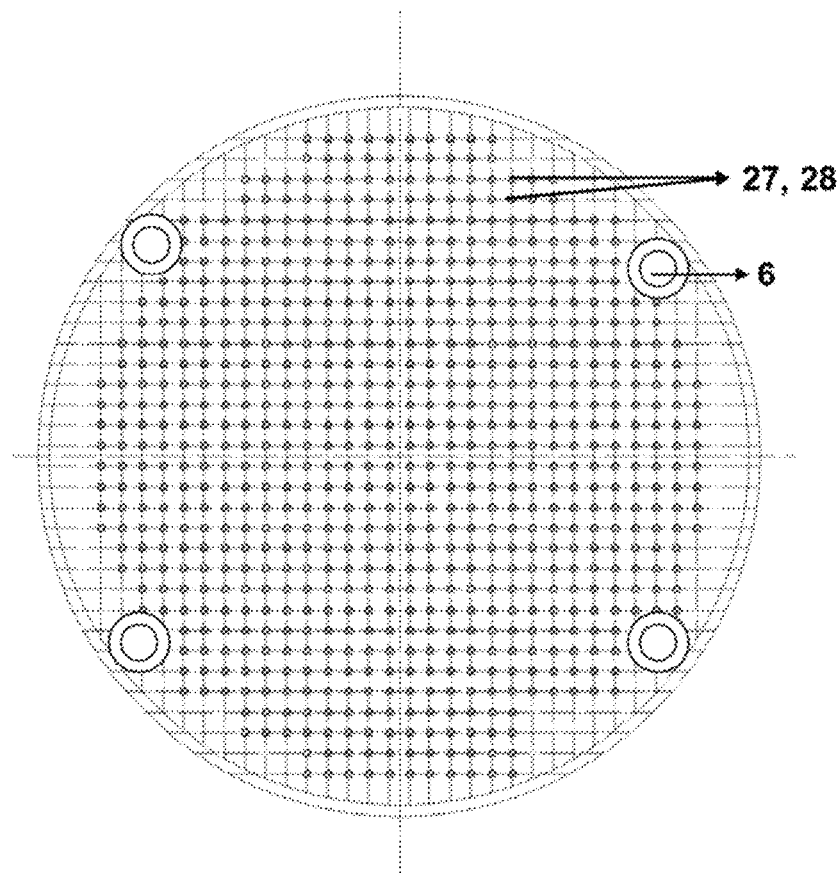
FIG. 12 is a schematic cross-sectional view of the reactor internal heat exchanging region (U-tube structure).

The header pipes 29 and 30 of the upper heat exchanger shown in FIGS. 10 and 11 are distributed on the same cross section of the reactor and forms smaller free space on the cross section. This structure is equivalent to a tray, which leads to gas-liquid separation of upward gas stream, while the heat exchanger apparatus have cooling effect on the gas stream, in which heavy products are partially condensed and this enhances liquid accumulation and separation from the gas stream passing through this tray. In addition, the heat exchangers thus arranged are uniformly distributed on the reactor cross section (FIG. 12), which benefits the dispersion of uprising gas bubbles and strengthens separation of liquids from the gas stream.

The annular tube structure (FIG. 13, 14) an also be used in composing the heat exchangers in this invention. This type of tube structure is beneficial to the uniform distribution of heat exchange components on the reactor cross section and to meet the process requirements of less steam generation in the downcomer (too much steam generation inside the downcomer can lead to system vibration).

Figure 13:
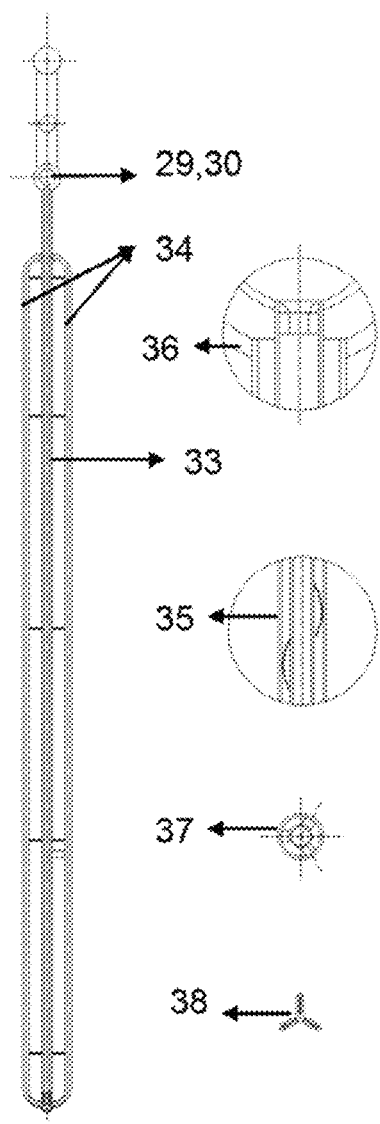
FIG. 13 is a schematic view of heat exchange components in annular tube structure.
Figure 14:
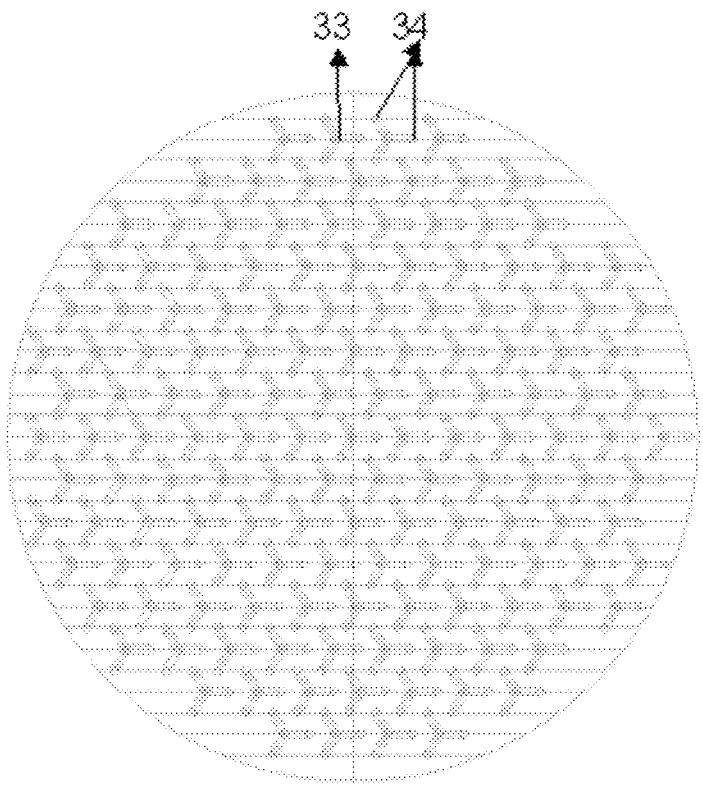
FIG. 14 is a schematic cross-sectional view of the heat exchange zone inside reactor (annular tube structure).

The main structure of the annular tube type heat exchanger can be shown in FIG. 13, where its major characteristics are: 1) the heat exchange components consist of annular tube 33 in the center, around which are three rising tubes 34 distributed in a equilateral triangular shape (see 38); 2) the inside tube of the annular tube is a downcomer, the annular space between the inside tube and external tube has similar function as that of the rising tube 34, the water inside the internal tube from header pipe 29 and 30 flows downward via the downcomer, while the rising team-water mixture medium enters the header pipe 29, 30 and its annular space via three rising tubes and the annular space 33. The annular space of central annular tube is equipped with elastic supporting structures fixed on the surface of the internal tube (see 35, 37) to assure even annular space along the tube; 3) The internal tubes of the header pipe are connected to the hot water recycling pump or the downcomer of the steam drum, the external tube (annular space) is connected to the rising tube of reactor external steam drum; 4) multiple groups of the heat exchange components forms a group of heat exchanger modules via an header pipe. Multiple groups of heat exchange modules are uniformly distributed over the reactor space (see FIG. 14).

Regarding the liquid-solid filtration system in the present invention, its structure is shown in FIG. 15-19.

The multiple groups of liquid-solid filtration and separation apparatus 5 are set up inside the reactor. The main header of each group of filtration component is connected to the devices outside of the reactor via the transitional pipe devices (FIG. 15) 39 and 40 passing the reactor wall.

Figure 15:
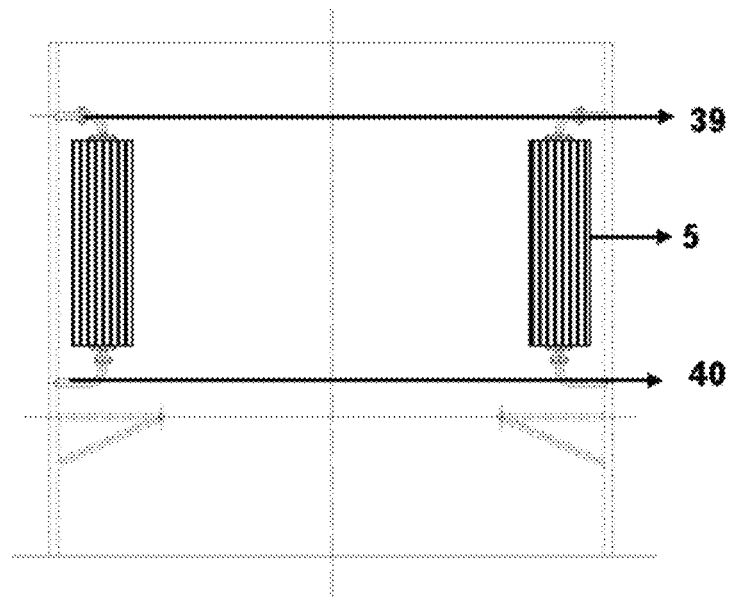
FIG. 15 is a distribution schematic view of the reactor filtration space.
Figure 16:
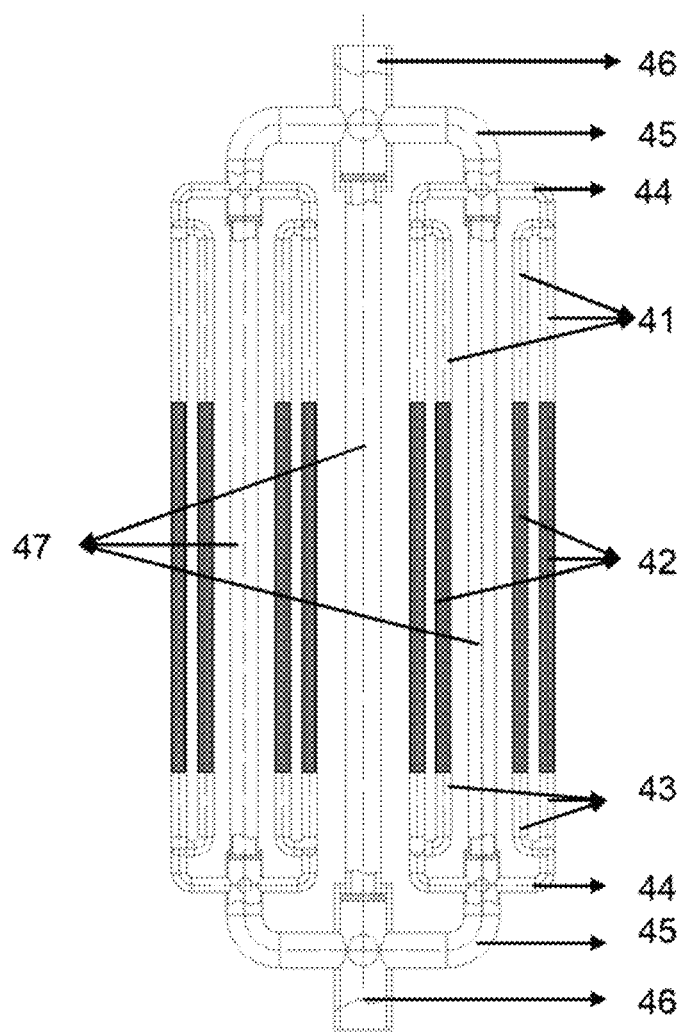
FIG. 16 is a structure schematic view of a filter group consisting of 48 filtering pipes.
Figure 17:
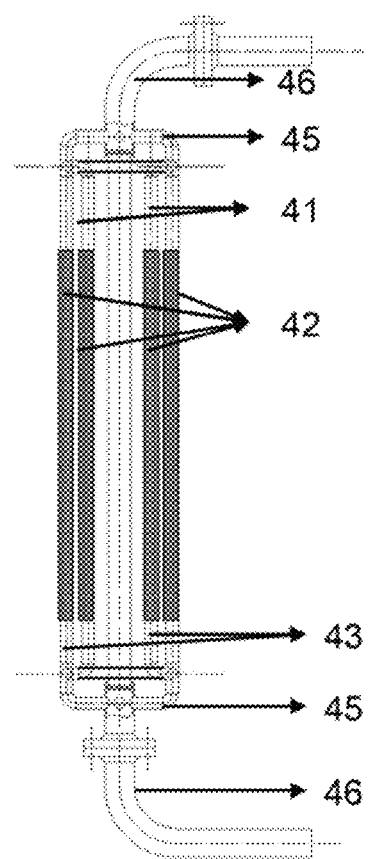
FIG. 17 is a structure schematic view of a filter group comprising of 12 filtering pipes.
Figure 18:
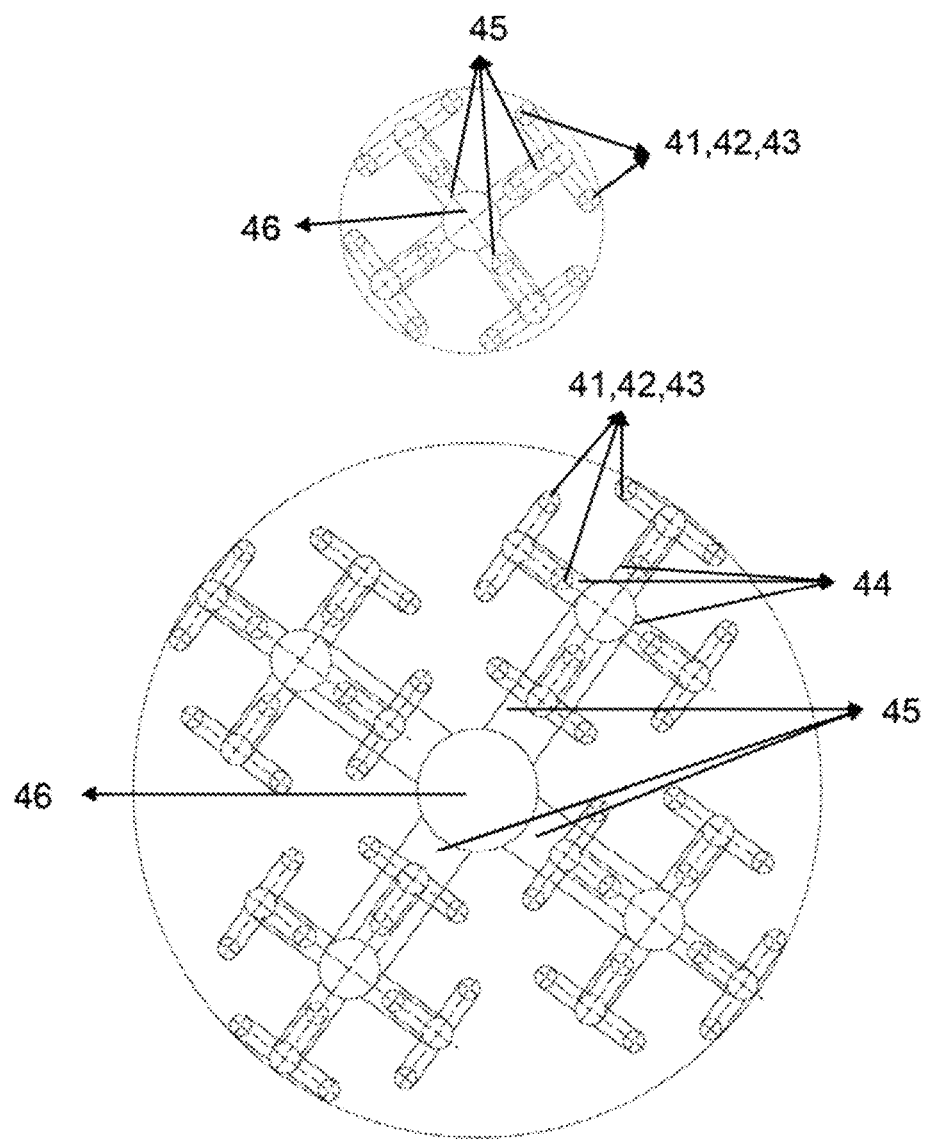
FIG. 18 is a top plan view of the reactor internal filter groups.

Each group of filtration components consists of filtration pipe assembly of 41, 42 and 43 and necessary supporting blind tube 47. The upper and lower ends of filtration pipe subgroup are separately connected via transitional pipe 44 and 45, the final group which consists of 48 filtration pipes is combined into main header 46 at the upper and lower ends and was extended to the outside of the reactor (FIGS. 15 and 16). Similarly, the structure of the filter group consisting of 12 filtration pipes is shown in FIG. 17. A bird's eye view of typical filter modules are given in FIG. 18 (12 filtration pipes and 48 filtration pipes respectively). This kind of structure can freely change the filtration pipe number in the filtration components among 3, 6, 12, 24, 48, 96 and 152. At the same time, from the perspective of the main header looking at each filtering pipe component, the present invention structure has achieved strictly uniformity in fluid resistance. In practice, the structure in present invention prevents filter cake bridging between filter components and is beneficial to complete elimination of filter cake by back washing, for example, in practice.

The filtering components can be back flushed filtering pipes suitable for use under the three-phase suspension bed F-T synthesis environment. According to the size distribution of catalyst particles under reaction operation, it is required that the pore diameter of the filtering element should be smaller than 90% plus of the catalyst particle size distribution, where generally commercial sintered/wound metallic wire mesh or porous metal with pore diameter from 10-30 μm and porous ceramics are selected as filtration media. One manual shutoff valve and one automatic shutoff valve are separately connected to the outlet conduit of each group of filtration components outside the reactor, where the manual shutoff valve is used during special maintenance and the automatic shutoff valve is controlled by a special filtration program via the DCS system. This setting can achieve individual control of each group of filtration component. Afterwards each group of outlet conduits are combined into the main header, among which the lower end outlet main header as an outlet for filtered wax is connected to the liquid receiving tank and pressure stabilizing system outside of reactor, while the upper end main header is connected to the cleaning system as the channel for the back flushing of filtration components. Constant pressure or programmed increasing pressure filtration can be adopted during filtration operation, where filtration components can be routinely cleaned.

According to pilot test result, the filtration zone under three-phase suspension bed operation conditions needs cooling to keep it at the same temperature as heat exchanging zone. Thus the configuration of the upper heat exchangers provides a central space circled by the ring-shaped filtration zone for installation of heat exchanging tubes, which can simultaneously improve the gas circulation and distribution in the filtration zone and guarantees the effective flushing of the filtration components by the three-phase fluid. At the same time according to pilot test result, the filtration space in a large reactor is large enough for distributing filtration groups 3-5 times of the actual operated filtration area. Considering the fragility of these filters, a suitable margin in the filtration area and easy maintenance issues have been addressed in the design. In the case of one-stage primary heat exchanger, the heat removal in the filtration zone needs independent small scale heat exchange component groups appropriately arranged according to the filter configuration.

According to pilot test result, the minimum distance between external surfaces of any two the filtration pipes should be in the range of 25-50 mm in the arrangement of a group of filtration elements. Too small a distance can cause filter cake bridging and hard to be completely cleaned by back flushing, leading to partial loss of filtration surface and negative influence on the filtration workload. In addition, relatively long transitional tube 41 (FIGS. 16 and 17) is connected to the upper end of the filter component (dense non-filtration zone) to prevent locally high bubble concentration (gas content larger than 70%) on the filtration surface due to the blockage of upper main headers, which leads to reduction in liquid discharge. In the present design, the length of transitional tube 41 connected to the upper main header should be larger than 300 mm and the length of the filtration media of the filtering pipe should be in the range of 1000-3000 mm. Polygonal structure consisting of a group of filtering pipe supported on upward and downward main headers and conduits is strengthened by central supporting blind pipe 47 to form a rigid body, which increases the overall robustness of filters and provides effective protection of filter elements.

Figure 19:
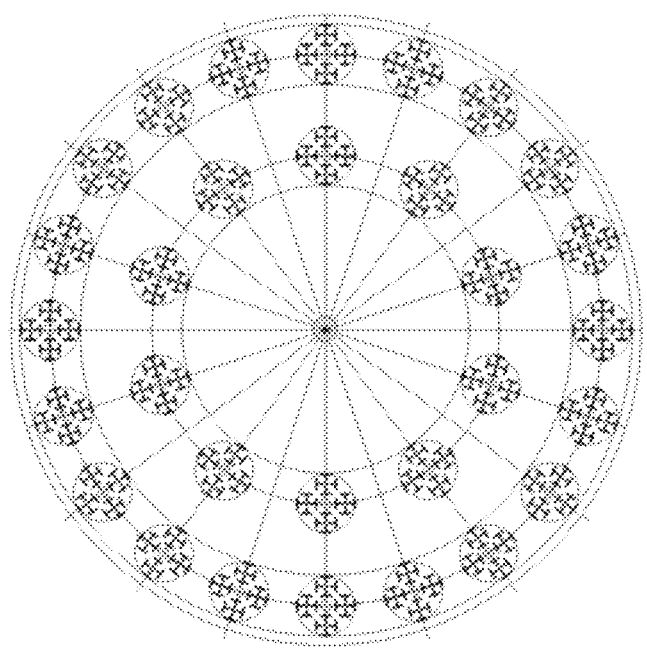
FIG. 19 is a layout schematic view of the filter groups on the reactor cross-section.

The arrangement of the abovementioned filters inside the large scale reactor can be designed according to the reactor size and the filtration capacity, where the configuration of 30 groups filters inside the reactor is shown in FIG. 19. Ancillary heat exchange apparatus can be installed in the space between filter groups for an effective temperature control in the filtration zone.

As shown in FIG. 1, multiple groups of liquid (solid) flow guidance pipe 6 located in the gas-liquid-solid three phase region in the reactor, where the conduit are fixed on the reactor wall. Its functions are: 1) strengthened liquid-solid phase cycling for improving catalyst distribution inside the reaction zone (to increase the catalyst content in the upper reaction zone); and 2) heat transfer integration axially along the reactor to increase the flexibility of two-stage heat exchangers for efficient heat removal.

The design principles of the flow guidance pipe are: 1) reasonable flow guidance pipe internal diameter to assure the large volume liquid-solid cycling; 2) the recycling of flow guidance pipe can effectively realize catalyst distribution axially along the reactor; 3) the axial position of the flow guidance pipe should take the effective recycle between two stage heat exchangers; and 4) large volume of liquid from the lower part heat exchangers supplied to the adiabatic space at the reactor bottom to remove the heat at the reactor inlet.

Figure 20:
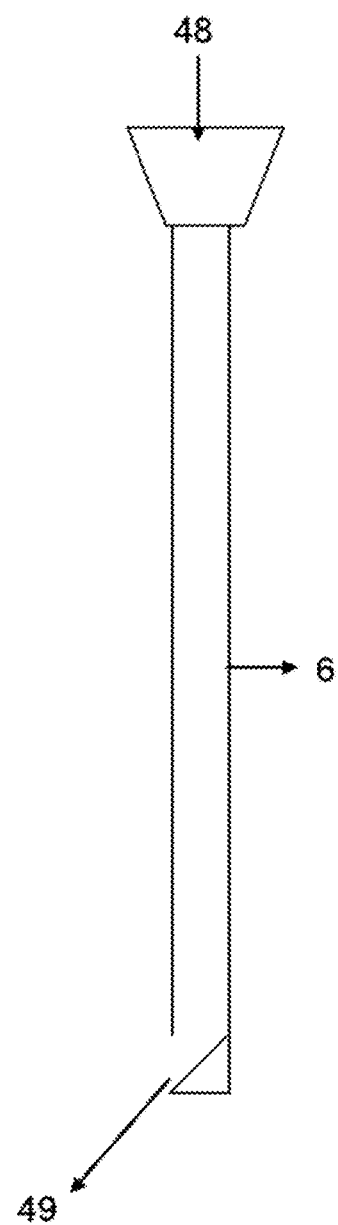
FIG. 20 is a structure schematic view of the flow delivery pipe.

The structure of flow guidance pipe is shown in FIG. 20. The upper inlet of the flow guidance pipe is an enlarged liquid receiving opening 48, the downcomer is a vertical pipe inside the reactor, where the low end outlets are lateral openings 49 facing reactor axis. The diameter of downcomer is determined by recycling volume, the diameter of liquid receiving opening 48 is generally 1.5 to 5 times larger in cross section area than that of flow guidance pipe. The flow guidance pipe should be larger than 5000 mm to assure sufficient driving force so as to reach a large downward liquid-solid volume.

In order to solve the problem of high solid contents in condensate products due to mist/foam entrainment from the reactor outlet, a reactor internal condensate separator 7 is fixed below the reactor outlet inside the upper reactor gas phase (see FIG. 1) to achieve secondary mist/foam separation.

Figure 21:
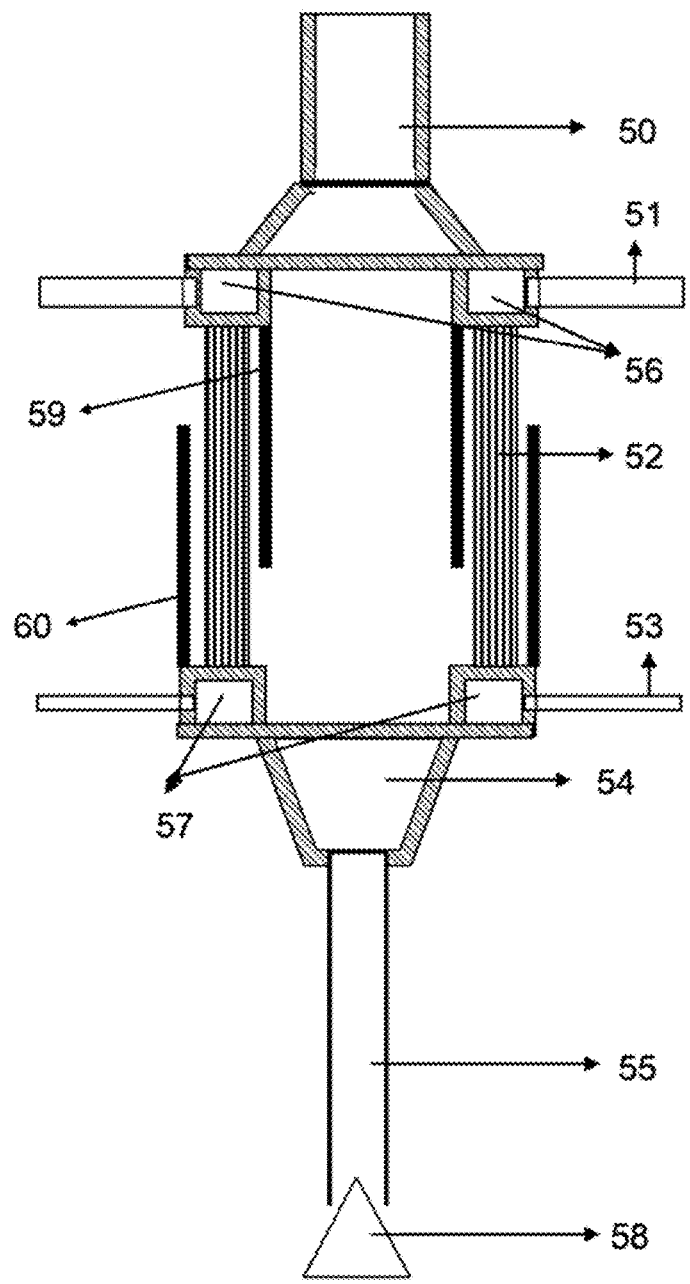
FIG. 21 is a structure schematic view of the secondary backflow condensate separator.

Inside the upper gas phase of reactor, when the reactor heat exchange system is divided into two sections, the separator system is a combination of upper heat exchanger and foam/mist separation structure, which forms partial condensation in the gas phase heat exchange region of the upper heat exchanger and a tray formed by the headers at the topmost end of upper heat exchanger groups causing backflow separation effect. Afterwards, gas stream passes a internal condensation separator 7 fixed below the reactor outlet 50 (see FIG. 21) to achieve secondary mist separation with its detailed structure shown in FIG. 21. The gas stream is cooled down/condensed and collides with external surface of heat exchange tube 52 (see FIG. 21), where mist together with the condensates grows into larger size liquid drop and a downward liquid film on the heat exchange tube surface is formed, and then the captured mist condensates, especially carrying catalyst fine particles are thus separated from the gas stream leaving off the separator to the outside of the reactor. The captured liquid and catalyst particles flow down along heat exchange pipes to the liquid receiving container 54, via a flow guidance pipe 55 to the upper space of a secondary heat exchanger (to the three phase space). A flow buffer facility (can be slide valve 58) is located at the lower end of the flow guidance pipe to prevent gas short cut, which reduces separation efficiency. An option is to set up bucket shaped baffle plate 59, 60 to strengthen condensate and mist/foam capture effect. The cooling medium in the top condensate separator is combined with the hot water-steam system in the reactor main heat exchanger. However, the hot water recycling pump is independent from where hot water enters the lower part collection box 57 via conduit 53 connected to the outside of the reactor. The hot water is partially vaporized by heat exchange pipe array 52, after which partially vaporized gas-liquid mixture is combined into the upper collection box 56 and then is transported to the steam drum outside the reactor via conduit 51. Compared to existing technologies, the mist/foam condensing and separation technology adopts simpler structure to realize backflow separation, which in practice can assure the solid catalyst content in the downstream condensate from the gas stream to be less than 2 ppm and thus completely eliminate the contamination on downstream hydrogenation.

In order to facilitate the useful application of the reactor in F-T synthesis processes, the following key process systems outside the reactor are equipped in embodiments of the present invention: 1) the reactor external filtered wax receptor and filtration pressure stabilizing system for the efficient operation of the internal filtration separator, 2) the reactor external cleaning system ancillary to the reactor internal liquid-solid separation system; 3) the backflow separation apparatus coupled with upper heat exchange component for transporting the upper gases outside the reactor, for example, a pre-condensate mist/foam separation system at the upper reactor outlet, and 4) ancillary system for handling deposited slurry equipped to the reactor bottom gas distributor.

Figure 22:
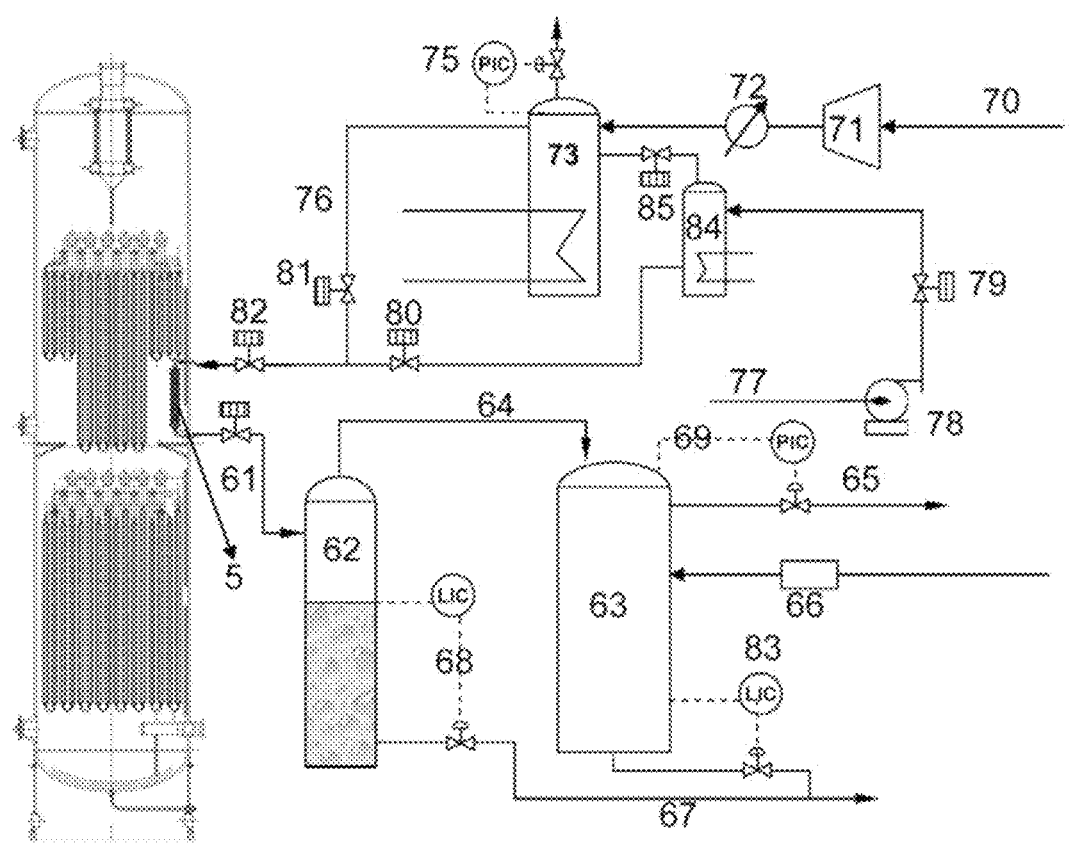
FIG. 22 is a process schematic view of the filtration-cleaning system.

A process flow scheme of the abovementioned filtered wax reception and filtration pressure stabilization system and the filtration-cleaning system is shown in FIG. 22. Specifically, multiple groups of filtration units 5 located inside reactor perform liquid wax and catalyst separation following suitable program with the condition that the three-phase bed liquid level inside reactor be maintained at a certain level during F-T synthesis operation. During filtration process, the shutoff valve 61 is switched on while the shutoff valve 82 is switched off. Hence the solid catalyst is kept inside reactor when the heavy wax is continuously separated from the slurry through the filter media. Under the pressure difference exerted on the external surface and internal surface of the tubular filter component, F-T wax and part of the entrained gas pass through the filtration media and enter the inside of the filtering component pipe, where the liquid F-T wax and the entrained gas go through the outlet conduit and shutoff valves 61 (one automatic and one manual) and enter the liquid wax receiving tank 62, where gas-liquid separation is completed and liquid stays at the bottom of the receiving tank and gas enters the gas pressure buffer tank 63 via conduit 64. The liquid F-T wax (primary filtered wax) is kept at a certain liquid level inside the liquid wax receiving tank 62, while pressure is reduced in the liquid level control system 68 and sent to downstream for further treatment via pipeline 67. In the gas pressure buffer tank 63, the entrained-desorbed gas from 62 enters pipeline 65 and is discharged from the unit after pressure reduction by the precise pressure control system 69. The small amount of the accumulated liquid inside the gas buffer tank is discharged by the automatic control system 83 and combined with pipeline 67. The pressure stabilization of drum 63 relies on a constant flow rate 66 of synthesis gas introduced from outside and a pressure control system 69 by releasing the gas in the drum 63. After a period of filtration operation by the filter facility, the accumulated solid filter cake on the external surface of filters needs to be removed. At this time, the valve 61 is closed to stop filtration and back flushing is started. The cleaning system of the filtration unit mainly consists of gas and liquid cleaning methods. The gas cleaning system mainly comprises of such as gas compressor 71, gas heater 72 and gas buffering tank 73 with heating and insulation function. Clean synthesis gas 70 from F-T synthesis enters a gas buffer tank 73 with heating and insulation function after pressurized in 71 and heating in 72 (equal to reaction temperature). The buffer tank is at the set cleaning pressure under the control of pressure via the pressure control system 75. Liquid cleaning system mainly consists of hot oil pump 78 and cleaning liquid metering tank 84 with heating and insulation function where liquid is stored and always in a backup mode for use. Makeup hot oil 77 is preferably the F-T distillate oil after downstream hydrogenation and with a boiling point from 300° C. to 380° C. The metering tank and the gas buffer tank of the gas cleaning system are connected via pipelines with automatic shutoff valve 85 to assure there is enough pressure inside metering pump to pressurize liquid into the filtering devices inside reactor during cleaning.

During purging of stopped filter groups, the automatic valve 61 is closed and 82 is opened; When gas is used in back purging, valves 80 and 85 are closed while 81 is opened for carrying out back purging. During liquid purging, valve 81 is closed with 80 and 85 open for carrying out liquid purging.

Figure 23:
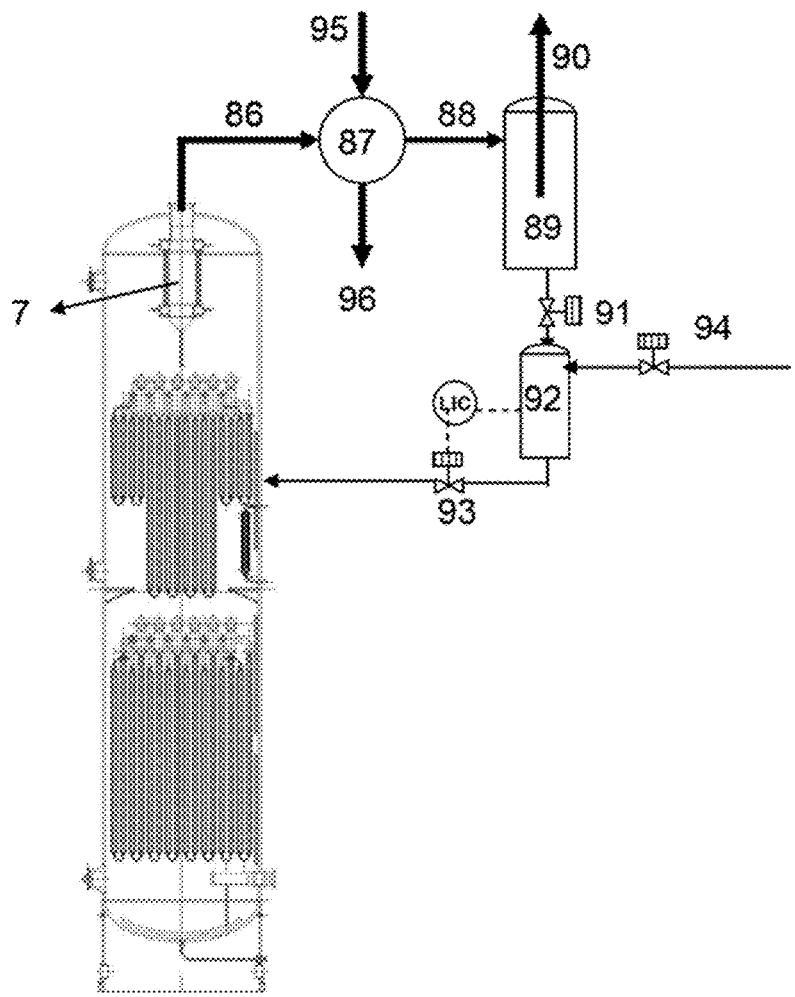
FIG. 23 is a process schematic view of pre-condensate separation system.

The reactor external pre-condensate separation system is shown in FIG. 23. Before the F-T synthesis, gas stream 86 exiting from the top of the reactor enters the main heat exchange process, it can be optionally fed into the heat exchange pre-condensate separation system outside the reactor. The system is primarily used for separation of liquid-solid entrained in the outlet gas stream and preventing contamination by entrained catalyst. The characteristics of the systems are as follows: the outlet gas stream 86 from the reactor uses a small heat exchanger (or a small waste heat boiler) 87 to cool down the gas stream by 5-10° C., part of the heavy oil carried in the gas stream is thus condensed and passes through a gas-liquid separator 89, where the liquid entrained and condensed from the gas stream is separated to prevent the entrained liquid-solid contents in gas stream 90 entering the downstream from causing catalyst contamination of the synthetic heavy oil products, to guarantee the quality of main synthetic oil products condensed from the gas streams, and thus to prepare for further processing. During normal operation, 89 is connected to a liquid receiving tank 92, where separated contaminated heavy oil enters the liquid receiving tank via the opened automatic shutoff valve 91 while the automatic valve 93 is turned off. When the liquid receiving tank 92 reaches maximum liquid level, the automatic shutoff valve 91 is shut off by the control system, and the receiving tank 92 is pressurized by opening the shutoff valve 94, allowing higher pressure gas enters into the tank, valve 93 is opened and the contaminated heavy oil is thus pressurized into the reactor at the same time. Or, this part of heavy oil can also be transported to the downstream contaminated oil treatment system for purification. The cold streams 95, 96 for cooling the gas stream through the heat exchanger (condenser) 87 can be preheated synthesis gas stream entering the reactor or a hot-water stream from any of the steam drums. When this system is installed, the reactor top condensate reflux unit 7 can be eliminated.

Figure 24:
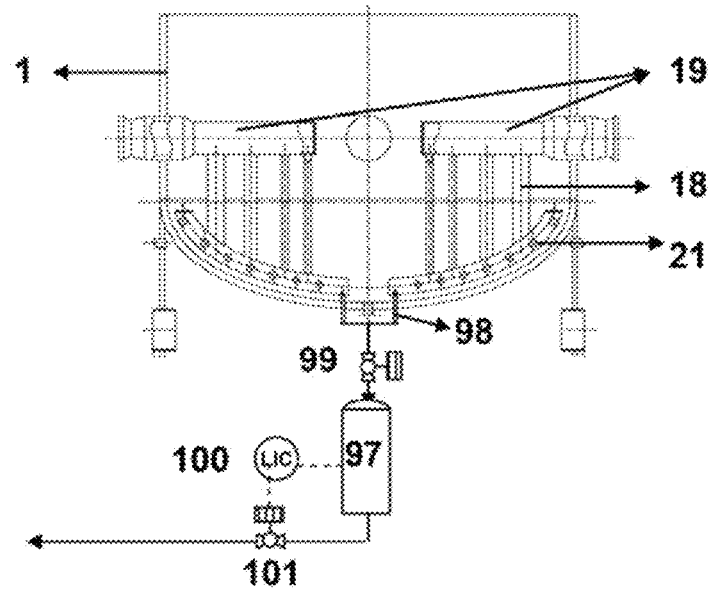
FIG. 24 is a structure schematic view of backflow slurry cleaning process of the conducting pipe type gas distributors.
Figure 25:
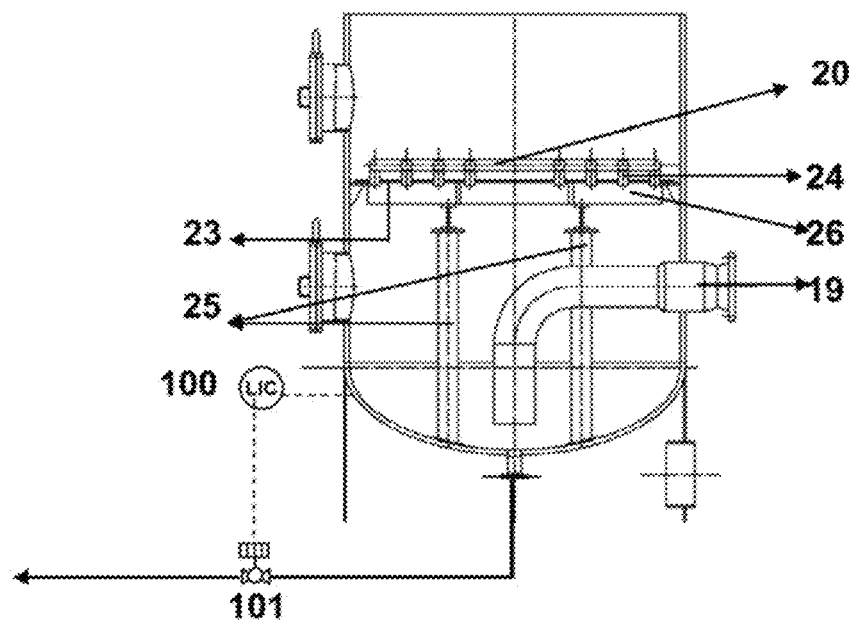
FIG. 25 is a structure schematic view of backflow slurry cleaning process of the clapboard type gas distributors.

In order to overcome the problem of slurry backflow and settling inside distributor, embodiment of the present invention provide corresponding process measures to clean the settled slurry and prevent blockage of distributors under any circumstances. These technical means are explained in the flow schemes shown in FIGS. 24 and 25. FIGS. 24 and 25 show gas distributors of direct introduction and clapboard type cases, respectively.

For direct introduction type gas distributor, the cleaning process of backflow slurry is shown in FIG. 24. The connection pipe 98 at the bottom of the main header 21 of the gas distributor is extended to the outside of the reactor and then is connected to a liquid receiving container 97 via a shutoff ball valve 99, which is in open mode during normal operation. Thus any slurry liquid returned to the gas distributor will be transferred to liquid receiving container 97 to prevent distributor blockage. If necessary, the liquid receiving container can be isolated from reactor by valve 99 to clean the slurry. The returning slurry can be transferred to catalyst reduction treatment unit via pipeline 101 from container 97. The accumulated liquid level inside 97 can be adjusted and controlled by liquid level control system 100.

For clapboard distributor, the cleaning process of backflow slurry is shown in FIG. 25. A simplified method for this case is to use the space between the clapboard and the bottom shell cover as a liquid receiving container equipped with a set of accumulated liquid level indication and control system. When accumulated liquid reaches a certain level, it is discharged by automatic or manual control systems.

EXAMPLE

Example 1

This example is the pilot test result with small scale reactor according to the technical scheme of the current invention.

The small reactor has all kinds of internal and external function members in the above mentioned reactor, among which the heat exchange devices are two primary heat exchangers. The gas distributor is of direct introduction type. The ancillary system for handling deposited slurry is located close to the reactor bottom gas distributor and is part of the design plan for the reactor.

The small reactor in the pilot test has a designed internal diameter of 349 mm and a height of 34 m. The catalyst used is a low temperature slurry bed F-T synthesis catalyst disclosed in CN1128667C (ZL01120416.8). The maximum syngas handling capacity is 500 $Nm^3$/h ($H_2$+CO content 98.8%), synthesis loop conversion is 94-96%, liquifiable product is 89 kg/h, and the catalyst content in the on-line filtration wax product is 0.5-4 ppm. The catalyst content is less than 2 ppm in the heavy condensate product and less than 0.5 ppm in light products.

Example 2

This example is the pilot test result with middle scale reactor according to the technical scheme of the current invention.

The small reactor has all kinds of internal and external function members in the above mentioned reactor, among which the heat exchange devices are two primary heat exchangers. The gas distributor is direct introduction type. The ancillary system for handling deposited slurry is located close to the reactor bottom gas distributor and is part of the design plan for the reactor.

The industry demonstration pilot F-T synthesis reactor has an internal diameter of 5.3 m and a height of 45 m. The reactor is equipped with all kinds of functional components mentioned above. The catalyst used is a low temperature slurry bed F-T synthesis catalyst disclosed in example 1 of CN1128667C (ZL01120416.8). The maximum syngas handling capacity is 140,000 Nm³/h (H₂+CO content 98.6%), synthesis loop conversion is 94-96%, the maximum liquified product production capacity is 25 ton/h, the deigned syngas handling capacity is 125,000 Nm³/h (H₂+CO content is 98.6%), the designed synthesis loop conversion is 94%, and the designed liquid product capacity is 22 ton/h. All parts of the reactor are designed conservatively with all parameters predicted to meet or exceed design specifications.

Hereinabove examples for embodiments of the present invention have been described in detail. For technical personnel in this field it is obvious that many changes and improvements can be done without deviating from the basic principles of the present invention. All of these changes and improvements are included in the claims of the present invention.

What is claimed is:

1. A gas-liquid-solid three phase suspension bed reactor for Fischer-Tropsch synthesis, which is used for F-T synthesis reaction of synthesis gas (CO+H₂) to synthesize F-T fuel by low temperature slurry bed process or high temperature slurry bed process in the presence of catalyst; the reactor comprising:
    a reactor main body having a vertical cylindrical body with a height of from about 25 meters to about 45 meters;
    a direct introduction type or a clapboard distribution type gas distributor located at a bottom of the reactor main body;
    a lower primary heat exchanger immersed in a three-phase reaction region and located in a lower portion of a reaction zone bounded by the reactor main body;
    an upper primary heat exchanger having a first portion immersed in the three-phase reaction region and a remaining portion extending above the level of the three-phase reaction region into a gas separation zone above the three-phase reaction region, the upper primary heat exchanger located in an upper portion of the reaction zone bounded by the reactor main body;
    an ancillary heat exchanger located above a the gas separation zone;
    a plurality of sets of solid catalyst-liquid heavy products separators disposed axially about at least a portion of the reactor main body;
    a plurality of groups of vertical flow guidance pipes, each group of the plurality of groups including at least one vertical flow guidance pipe to circulate a respective vertical portion of the three-phase reaction region and positioned axially about an inside of the reactor main body;
    a mist separation device located proximate a top of the reactor main body; and
    at least two supplemental systems, including an ancillary system proximate a bottom of the reactor main body to handle deposited slurry, and a pre-condensate and mist separation system located in a top of a reactor outlet.

2. A gas-liquid-solid three phase suspension bed reactor according to claim 1, wherein said direct introduction type gas distributor is located on a surface of a bottom shell of the reactor main body, and said direct introduction type gas distributor includes multiple groups of ring structures, spaced 10-200 mm from a downward side surface of said direct introduction gas distributor to an internal surface of the bottom shell of the reactor main body, each ring structure of the direct introduction gas distributor equipped with a number of pipe fittings each with a number of gas sparger openings pointing downward, the gas sparger openings having a diameter in the range of 1.0 millimeters (mm) to 8.0 mm, the sparger openings which can flush the internal surface of the bottom shell of the reactor main body with a gas at a velocity of 20 meters per second (m/s) to 100 m/s; said direct introduction gas distributor includes also includes a number of ring shaped flow guidance baffle plates between the ring structures, which ring shaped flow guidance baffle plates are connected to the internal surface of the reactor shell in parallel to a reactor axis, a height of each of the ring shaped flow guidance baffle plates being 10 millimeters (mm) to 300 mm to assure a final upward gas flow vertically, the and the ring shaped flow guidance baffle plates arranged in a circular or pie sliced region and connected with a gas inlet pipe via several conduits to form a group of gas distributors.

3. A gas-liquid-solid three phase suspension bed reactor according to claim 1, wherein said ancillary system for handling the deposited slurry equipped for the reactor includes: a connecting tube located at a lowest part of a distributing and gathering pipe that extends outside the reactor main body and which is fluidly connected to at least one of a liquid receiving container, which is adjusted and controlled by a liquid level control system or a space formed by the bottom shell cover that serves as a liquid receiving container and which is equipped with a liquid accumulation level indication and control system so that accumulated liquid can be discharged via automatic control or manual control system.

4. A gas-liquid-solid three phase suspension bed reactor according to claim 1, wherein the vertical cylindrical body height of said main body of F-T synthesis three-phase suspension bed reactor is 28 meters to 40 meters, to achieve a maximum superficial gas velocity of 0.50 meters per second (m/s), and a reactor internal diameter of 2 meters to 15 meters, suitable to achieve a superficial gas velocity of 0.35 meters per second (m/s) to 0.45 m/s, a reactor internal diameter of 4 meters to 12 meters, where a reactor productivity based on $C_3^+$ hydrocarbons is 16 tons/hour to 25 ton/hr for a 5 meter reactor internal diameter, 45 tons per hour (tons/hr) to 70 ton/hr for an 8 meter reactor internal diameter, 70 tons per hour (ton/hr) to 100 ton/hr for a 10 meter reactor internal diameter, or 90 tons per hour (ton/hr) to 140 ton/hr for a 12 meter reactor internal diameter.

5. A gas-liquid-solid three phase suspension bed reactor according to claim 1, further comprising:
    at least one of a one-stage or a two-stage primary heat exchanger which includes at least one of a number of U-tube tube heat exchange components or a central annular tube with rising tube as heat exchange components;
    a number of groups of heat exchange modules that includes several groups of heat exchange components via a group of main headers equipped with one or more supporting components, which are located at both ends of the main headers and mounted on a number of supporting members of a wall of the reactor to form hanging-up structure, and wherein a lower end of the primary heat exchanger proximate a lower part of the reactor main body is positioned 0.1 meter to 3 meters above the gas distributor.

6. A gas-liquid-solid three phase suspension bed reactor according to claim 5, further comprising:
    a number of liquid-solid filtration separation devices to separate a solid catalyst and a liquid heavy wax and to remove heavy wax products, the liquid-solid filtration separation devices located vertically in a middle-upper portion of the reactor main body; and where there is only one primary heat exchanger, the filtration separation devices located above the primary heat exchanger; and where there are two primary heat exchangers, the liquid-solid filtration separation devices located between two primary heat exchangers, and each of the number of liquid-solid filtration separation devices includes multiple filtering elements which comprise of from 12 to 60 filtering pipes; both ends of each filtering pipe connected to a pipe assembly and extending outside the reactor main body via intermediate an delivery pipe following fluid uniform distribution principle; a lower end of the delivery pipe connected to an external wax discharge and a pressure stabilizing system to remove filtered wax liquid, an upper end of the delivery pipe connected to a cleaning system for on-line cleaning of the filtering pipe, the filtering pipes consisting of metal filtering pipes which can be back blown; a filtration media contained in the filtering pipes, the filtering media having a pore size of from about 1 micrometer (μm) to about 50 μm and a length of from about 0.3 meters to about 3.0 meters to reduce a catalyst content in a filtered liquid wax to less than 100 parts per million (ppm).

7. A gas-liquid-solid three phase suspension bed reactor according to claim 6, wherein said liquid-solid filtration separation devices are located in a ring shaped region close to the wall in the reactor; each group of the filtration separation device is a filtration element that includes twenty (20) to fifty (50) filtration pipes, a length of a filtration section of the filtration pipes is from about 0.5 meters to about 2.5 meters; the filtration pipes being sintered/wound metal wire filtration pipes or sintered porous metal/ceramic filtration pipes, having a pore size of from about 10 micrometers (μm) to about 30 μm in diameter; and a minimum distance between adjacent filtration pipes of from about 20 millimeters (mm) to about 50 millimeters.

8. A gas-liquid-solid three phase suspension bed reactor according to claim 1, wherein at least one of the plurality of groups of flow guidance pipes can be located at a position inside the three-phase suspension bed and close to wall of the reactor, which is used for heat integration of the two-staged heat exchangers and for increasing the recycle volume of the suspension liquid to improve the catalyst distribution axially along the reactor.

9. A gas-liquid-solid three phase suspension bed reactor according to claim 1, wherein said mist separation device includes a primary mist separation device located in upper portion of the reactor main body and a secondary mist separation device external to the reactor main body, the secondary mist separation device being a cylinder condenser connected to the reactor outlet pipe, the cylinder condenser including a cylinder structure formed by one to eight layers of compactly arranged heat exchanging pipes equipped with a cone-shaped collector at a bottom of the condenser; whenever the mist entrained gas flow passes the heat exchanging pipe spaces, condensation and collisions occur, and the mist particles are grown and captured at the heat exchanging pipe wall which forms into a liquid film and flows into a bottom cone-shaped collector, then which flows downward through a back flux delivery pipe located at the bottom of the cone to the upper space above a primary baffle plate at least a portion of which includes a main header for the upper primary heat exchanger, to form liquid back flux and improve separation efficiency, to provide a first condensate product having a catalyst content of less than 2 parts per million (ppm).

10. A gas-liquid-solid three phase suspension bed reactor according to claim 1, wherein said pre-condensate mist separation system located at the reactor outlet includes a pre-condenser, a gas-liquid separator, a small liquid receptor and a number of automatic valves; the pre-condensate mist separation system to reduce a temperature of a gas flow from about 5° C. to about 10° C., and to provide a solids content of less than 2 parts per million (ppm) in a condensate formed at least partially by the gas flow.

11. A gas-liquid-solid three phase suspension bed reactor according to claim 1, wherein said F-T synthesis catalyst is at least one of: an iron-based catalyst of low temperature slurry bed process at reaction temperature of about 240° C. to about 250° C., with performance reaching about 0.3 kilograms of $C_3^+$ hydrocarbons per kilogram-hour (kg $C_3^+$/kg h) to about 0.6 kg $C_3^+$/kg h, methane selectivity of from about 2.0 weight percent (wt %) to about 5 wt %, and $C_2$-$C_4$ selectivity of from about 4.0 wt % to about 12.0 wt %; or an iron based catalyst used for high temperature slurry bed process of reaction temperature from about 250° C. to about 290° C., with performance reaching about 0.4 kg $C_3^+$/kg h to about 0.9 kg$C_3^+$/kg h, methane selectivity of from about 2.0 wt % to about 4.0 wt %, and $C_2$-$C_4$ selectivity of from about 3.0 wt % to about 10.0 wt %.

12. A gas-liquid-solid three phase suspension bed reactor according to claim 1, further comprising:
a plurality of groups of solid catalyst-liquid heavy products separators distributed in an annular region close to a wall of the reactor main body.

13. A gas-liquid-solid three phase suspension bed reactor according to claim 12, further comprising a number of external supplemental devices that include at least one of:
a filtered wax receptor and filtration pressure stabilization system for efficient operation of at least a portion of the plurality of groups of solid catalyst-liquid heavy products separators; and
a cleaning system for at least a portion of the plurality of groups of solid catalyst-liquid heavy products separators;
wherein the filtered wax receptor and filtration pressure stabilization system comprises a liquid wax receptor and its liquid level control system, a gas pressure buffer tank, a pressure stabilization tank and a precision pressure control system;
wherein the cleaning system comprises a gas cleaning system and/or a liquid cleaning system;
wherein the gas cleaning system includes a gas compressor, a gas heater and a thermally insulated gas buffer tank; and wherein at least one of: a synthesis gas, nitrogen, or a synthesis gas from the F-T synthesis process provides at least a portion of a cleaning medium;
wherein the liquid cleaning system includes a heated, thermally insulated, hot oil pump and cleaning liquid metering pump.

14. A gas-liquid-solid three phase suspension bed reactor according to claim 1, wherein the gas-liquid-solid three-phase suspension reactor includes from one to eight groups of the gas distributors, which are formed into a single uniformly distributed gas distributor proximate a bottom shell of the reactor main body; a downward side surface of the ring structures of the gas distributor is spaced about 30 millimeters (mm) to about 150 mm from an internal surface of the bottom shell of the reactor main body; each of a number of gas sparger openings in the gas distributor having a diameter of from about 1.5 mm to about 5 mm such that the gas sparger openings can flush the internal surface of the bottom shell with a gas having a velocity of from about 30 meters per second (m/s) to about 90 m/s.

15. A gas-liquid-solid three phase suspension bed reactor according to claim 1, wherein the clapboard type gas distributor is includes: clapboards positioned above a welding line between the lower portion of the reaction zone to separate the reaction zone from a free space proximate a bottom shell of the reactor main body; a number of distributor pipe fittings located on an upper side of the clapboard and closely connected to the clapboards via a number of downwardly facing intermediate pipes, each of the number of distributor pipe fittings connected to the free space through the clapboard, and a number of inlet gas conduits that enter the free space and are pointing downward toward an internal surface of the bottom shell of the reactor main body.

16. A gas-liquid-solid three phase suspension bed reactor according to claim 12, wherein the plurality of groups of a solid catalyst-liquid heavy products separator are located above the lower primary heat exchanger or between two stages of at least one of: the lower primary heat exchanger or the upper primary heat exchanger.

17. A gas-liquid-solid three phase suspension bed reactor according to claim 12 wherein
the ancillary heat exchanger is located at an upper part of a separator zone that includes at least one group of solid catalyst-liquid heavy products separators, and extends into a space existent between each of the solid catalyst-liquid heavy products separators in the at least one group of solid catalyst-liquid heavy products separators.

18. A gas-liquid-solid three phase suspension bed reactor according to claim 12 wherein the pre-condensate and mist separation system includes a secondary mist separator at the upper outlet of the reactor main body.

19. The gas-liquid-solid three phase suspension bed reactor according to claim 13 wherein a cleaning medium used by the a heated, thermally insulated, hot oil pump and cleaning liquid metering pump includes a dehydrogenated F-T distillate oil having a boiling point of from about 300° C. to about 380° C.

20. A gas-liquid-solid three phase suspension bed reactor according to claim 12 wherein the mist separation device includes a primary condensing type mist separation device combined with at least one of an upper primary heat exchanger or at least one of a number of ancillary main header pipes.

* * * * *

UNITED STATES PATENT AND TRADEMARK OFFICE
CERTIFICATE OF CORRECTION

PATENT NO. : 8,506,895 B2  
APPLICATION NO. : 12/527355  
DATED : August 13, 2013  
INVENTOR(S) : Jinsheng Wang et al.

It is certified that error appears in the above-identified patent and that said Letters Patent is hereby corrected as shown below:

In the Claims

Column 27, Lines 37-38:
"an ancillary heat exchanger located above a the gas separation zone;" should read, --an ancillary heat exchanger located above the gas separation zone;--.

Column 28, Line 1:
"introduction gas distributor includes also includes a number of" should read, --introduction gas distributor includes a number of--.

Column 28, Line 7:
"to assure a final upward gas flow vertically, the and the ring" should read, --to assure a final upward gas flow vertically, and the ring--.

Column 29, Lines 5-6:
"outside the reactor main body via intermediate an delivery pipe following fluid uniform distribution" should read, --outside the reactor main body via an intermediate delivery pipe following fluid uniform distribution--.

Column 30, Lines 64-65:
"according to claim 1, wherein the clapboard type gas distributor is includes: clapboards positioned above a welding line" should read, --according to claim 1, wherein the clapboard type gas distributor includes: clapboards positioned above a welding line--.

Column 32, Lines 8-9:
"according to claim 13 wherein a cleaning medium used by the a heated, thermally insulated, hot oil pump and cleaning" should read, --according to claim 13 wherein a cleaning medium used by the heated, thermally insulated, hot oil pump and cleaning--.

Signed and Sealed this  
Twenty-second Day of April, 2014

Michelle K. Lee  
*Deputy Director of the United States Patent and Trademark Office*